United States Patent [19]

Gendron et al.

[11] Patent Number: 4,860,204
[45] Date of Patent: Aug. 22, 1989

[54] COMPUTER BASED WORKSTATION FOR DEVELOPMENT OF GRAPHIC REPRESENTATION OF COMPUTER PROGRAMS

[75] Inventors: Robert F. Gendron, Salem; E. Webb Stacy, Jr., Tewksbury; Tudor V. Ionescu, Sudbury, all of Mass.

[73] Assignee: Softron, Inc., Waltham, Mass.

[21] Appl. No.: 11,500

[22] Filed: Feb. 5, 1987

[51] Int. Cl.⁴ .................. G06F 3/00; G06F 15/62
[52] U.S. Cl. .................... 364/300; 364/518; 364/513; 340/747
[58] Field of Search .............. 364/518, 521, 300, 513; 340/747

[56] References Cited

U.S. PATENT DOCUMENTS

| | | | |
|---|---|---|---|
| 4,315,315 | 2/1982 | Kossiakoff | 364/300 |
| 4,449,180 | 5/1984 | Ohshima et al. | 364/147 |
| 4,455,619 | 6/1984 | Masui et al. | 364/900 |
| 4,536,840 | 8/1985 | Borta | 364/300 |
| 4,546,435 | 10/1985 | Herbert et al. | 364/300 |
| 4,656,603 | 4/1987 | Dunn | 364/900 |
| 4,675,829 | 6/1987 | Clemenson | 364/513 |
| 4,713,775 | 12/1987 | Scott et al. | 364/513 |

Primary Examiner—Gary V. Harkcom
Assistant Examiner—Randy W. Lacasse

[57] ABSTRACT

A workstation that employs methods to construct computer programs through use of visual graphical representations. Computer programs are illustrated as visual road maps of the intended sequence of actions. Each operational entity in a program graph on the screen is represented as an elemental "atomic" unit, called a "Softron". The Softron is a multidimensional, graphical "atom" of programming information which has four modes of operation, termed "layers". The four layers are Normal, where the basic functionally of the application resides; Initialization/Reset, responsible both for the startup values of important variables and for their values at strategic checkpoints; Error, which handles conditions outside design limits; and Input/Output, which performs human input/output and other I/O tasks. Softrons reside in very general form in the workstation's library, and are optimized by the process of specialization. Softrons may be grouped to form new Softrons by a process called Logical Zoom (TM). Logically Zoomed Softrons may combine with other Softrons to form a computer program of arbitrary complexity.

8 Claims, 45 Drawing Sheets

| APPROACH \ FEATURE | Explicit Control Lines | Explicit Data Lines | Executable Result | No Language Involved | Separate Init, Error, I/O Layers |
|---|---|---|---|---|---|
| Visual Programming | Yes | Yes | Yes | Yes | Yes |
| Object Oriented Programming | — | — | Yes | — | — |
| Flow Charts | Yes | Yes | — | — | — |
| Data Flow Graphs | — | Some | — | — | — |
| Top-down Structured Design | Some | — | — | Some | — |
| Conventional And 4th Gen. Languages | — | — | Yes | — | — |

FIG 8

| APPROACH \ FEATURE | Parameter Conformability Checking | Single Elemental Software Unit | Full Power as Preprocessor | Global Optimization | Groupings Yield Uniform Units |
|---|---|---|---|---|---|
| Visual Programming | Yes | Yes | Yes | Yes | Yes |
| Object Oriented Programming | — | Some | — | — | Some |
| Flow Charts | — | — | — | — | — |
| Data Flow Graphs | — | — | — | — | — |
| Top-down Structured Design | — | — | — | — | — |
| Conventional And 4th Gen. Languages | Some | — | — | — | — |

FIG 9

FIG. 15 Two control line connection options.

Final apperance on the screen after logically zooming a "*" Machine.

An organization chart of a corporation to be simulated

COMPUTER BASED WORKSTATION FOR DEVELOPMENT OF GRAPHIC REPRESENTATION OF COMPUTER PROGRAMS

BACKGROUND OF THE INVENTION

For reasons outlined below, conventional software has evolved into a morass of different languages and applications, as shown in FIG. 1. Visual programming of the present invention provides a way to unscramble the software puzzle because it is designed to support clear separation of intuitively separate functions; it is designed to support easy integration with almost all "foreign" applications. An iconic representation of the transformation of the software world that Visual Programming will provide may be seen in FIG. 2.

In the rest of this specification, the term "user" will be used to mean "developer" and "maintainer". The workstation user, then, is not the ultimate end user, but rather the person who is constructing or modifying software.

Up until 10 or 15 years ago, programs written for computers were usually prepared on punch cards and submitted to a system operator, and the results were usually returned to the user printed on paper. With this arrangement, the user had little or no direct interaction with the computer itself, but was forced to develop programs in "batch" mode. In the late 1960s and early 1970s, users began to be able to interact directly with computers, but primarily through typing characters at a keyboard on a teletypewriter and seeing the computer respond by typing results on the paper in the teletypewriter. This hardcopy-based human computer communication virtually forced humans to use character oriented means to program computers, resulting in computer languages being the only means to program computers.

It has been less than 10 years since the widespread use of CRT-based terminals and personal computers has allowed for the possibility of users interacting with computer generated graphics. To date, the possibilities of interaction with computer generated graphics at an interactive computer workstation as a means of generating computer programming has been explored to a very limited extent. Hence, the impact of new and emerging interactive computer graphics capabilities has not yet been felt in software development methods.

Conventional software development generally consists of four distinct stages: edit, translate, link, and test. The stages are repeated in sequence as necessary until the software has the desired functionality.

In the edit stage, the user generates executable statements in a computer language. A computer language is like a natural language such as English in that it involves expressing instructions with words using predetermined word sequence and word meaning rules. Typically, the user sits at a terminal or a small computer and enters a sequence of words into a text editor, and then saves his or her work to a file. The user thus starts with a basically blank screen and creates the program text by typing at the keyboard.

Once the user has entered and saved the language text, he or she invokes a translator. The translator converts the linguistic representation to binary instructions. The translation process is normally not visible to the user; the translator simply notifies the user when it is finished. The binary instructions serve as "masks" for the computer hardware to perform operations on data.

If the translator detects an error in the syntax or an inconsistency in the semantics of the statements, it produces a warning or an error message and attempts to help the user locate the problem, although it may not be able to do so very well. If errors are detected, the user again edits the computer language text and submits the revised version to the translator again. Once the specific binary instructions are generated, the program may be loaded to computer memory and executed until the program statements are exhausted.

Typically, the user creates independent computer program components by alternating between the edit and the translate stages. The components accept data by a defined parameter passing mechanism. Usually, when an independent program component receives a parameter set it operates as if it were a stand alone program except that when it terminates it returns some or all of the internally calculated results to another independent program component. When independent program components are combined to form larger programs they are said to be "linked", that is, known to each other. The parameter passing mechanism is a property of the language translator, so that "foreign languages" may "communicate" with one another at the linkage step if the data interchange between foreign components has been appropriately defined.

In the debugging stage, the user loads the (linked) executable program to computer memory and exercises it to determine if the desired results are achieved. In most instances a new program fails to perform as originally intended. There are typically several methods at the user's disposal to determine the problem: to inspect the language statements, to insert diagnostics into the language statements via the editor and then retranslate, relink, and reexecute, or to use a debugging utility that helps show program status and the values of data at each step. Once the program has been identified, the user returns to the first step, alters the language statements, and repeats steps two through four. The process is repeated until the program performs as intended.

Computer scientists have attempted for some time to define principles of software development in order to simplify and clarify the construction of complex software systems. The output of this effort has been to develop computer languages whose constructs encourage clear representations for flow of control within program elements and well understood data interchange mechanisms between program elements.

One thrust of this effort has been to establish general design guidelines. Two complementary points of view emerged in the 1970's. The first, known as "top down structured programming", was made possible in 1964 with Bohm and Jacopini's (1964) discovery that every program can be rewritten using repeated or nested units of no more than 3 different kinds: sequence, conditional, and iteration. Specifically, this article showed that there was no logical necessity for the "goto" statement. Top down structured programming was developed and elaborated (e.g., McGowan & Kelley, 1975; Dijkstra, 1976; and many others), and was quickly accepted among the academics and industry practitioners.

The top down theory holds that design should start at the top of the problem and specify the major functional requirements that should be satisfied. The identified functions are selected as reasonable partitions based on "distance" from one another, such as "load a file" and "perform mathematical operations". When the high level functions are established the original principle is applied to each function at the next level. The method also requires that each defined module have a clear list of inputs and outputs. This "factoring" of the problem into a series of layers is not scientific, but at least provides guidelines in how to reduce a complex problem into groups of simpler ones.

Another significant definition as part of the "top down" strategy deals with how the flow of control proceeds within any given module. Each module has a single point of entry where execution begins and a single point of exit from execution, regardless of the purpose of the module. The flow of control thus begins at the top of the module and proceeds strictly downward. The only exceptions are the code segments which are repetitively executed. Conditional flow constructs define what is to be executed when given conditions are met.

The second modern view of software development produced a concept known as "object oriented programming" (Byte, 1981; Goldberg & Robson, 1983; Cox, 1986; SIGPLAN, 1986). Object oriented programming went largely unnoticed by the majority of computer scientists and software engineers in the 1970's. The top down approach was conceptually simple and attractive to most, and the object oriented method continued in the background strictly at the research level. The top down philosophy is still a strong force in current software development while the subtler object oriented approach is gaining wider acceptance due to a demonstrable increase in productivity.

The object oriented approach is subtler than the top down approach. It is based on the idea that the separation of data constructs from code constructs is not necessarily clear cut. Data are considered active in the sense that they have operations directly attached. For example, a number has "knowledge" (a built in property) of how to multiply itself by other numbers. As a result a "number" is a compound element consisting of a value plus the ability to perform operations such as multiply. In general, an object is an entity that accepts service requests from other entities. The object oriented approach gives a different flavor to software design since each object, when solicited for service, can in turn solicit services from other objects in order to complete the original service.

The dynamics of an object oriented system is primarily that of an information network where each node (object) may issue a message to any other node requesting one of the available services at that node. The receiver in turn issues messages to other receivers until the final service is complete at which point the original sender again takes control of the information network.

One of the major advantages of object oriented programming is embedded in the inseparability of code and data. The data internal to a module is totally hidden. That is, it is impossible for one object directly to access data internal to other objects, and thus data may be viewed as protected. This view, which is not explicitly enforced in the top down strategy, guarantees a clear separation of data between foreign modules.

In terms of code bulk (sheer number of lines), the object oriented methods have demonstrated considerable savings, especially for complex tasks. That translates directly to time and effort savings provided that the developer is sophisticated enough to master the messaging concept and to factor the problem into a judicious set of objects.

It has long been a formal part of any software design process that the user creates "block" functions in a hierarchical diagram that indicates what functions are to be performed by independent modules. Flow charting methods, which have also existed for a long time, are also sometimes created to indicate the operation of computer programs with more precision than hierarchical block diagram. There are now standards for flowchart symbols (ANSI, 1970) and the technique has been elaborated to encompass structured methods (Nassi & Schneiderman, 1973). The primary use of flowcharts and block diagrams is documentation. Unfortunately, neither block diagrams nor flowcharts provide a mechanism for a clear coordination and separation of data between modules. They also cannot guarantee that any of of the data interfacing requirements of foreign modules will be met. These remarks apply whether or not computer aids are used to create block diagrams or flowcharts: in the end, in conventional programming, computer language must be entered into the computer to create computer programs.

Research in parallel processing has discovered that sequential execution of instructions in programs as originally entered is not the only order in which the instructions can be executed correctly. This alternate view is based upon seeing the "data flow" requirements of the program (Karp & Miller, 1969; Backus, 1978; and many others). Operations are interdependent if and only if they access the same data. If modules share no data they may be executed concurrently with no loss of logical integrity, no matter what the form of the original program. Graphs which indicate the independent paths in which data must be accessed are termed "data flow graphs". Data flow graphs, obviously, show the flow of data (unlike block diagrams and flowcharts) but omit the flow of control (again unlike block diagrams and flowcharts). However, data flow graphs are no more sufficient to create computer programs in conventional environments than are block diagrams and flowcharts; conventional environments require that the program be expressed in computer language.

There have been several attempts to support the activity of software development with knowledge based systems, although most of them currently remain in the laboratory. A project at Xerox Palo Alto Research Center, called Programmer's Assistant, has attempted to support the programmer by providing a rich window-oriented environment, allowing access to many "power tools for programmers" and computer language editors that provide language templates for common functions (Teitelman, 1984; Brown, 1985). Similarly, a knowledge-based editor called DED attempts to provide programming knowledge to the user as the program is being constructed (Barstow, 1984). These efforts are aimed at helping users construct programs in INTERLISP, a dialect of a computer language.

A recent issue of IEEE *Computer* was devoted to reviewing the state of the art in visual programming (August, 1985). None of the systems reviewed in that issue incorporated any of the technologies claimed in this application, but a review of them is in order.

Raeder (1985) reviewed a number of generic programming techniques that involve diagrams, including flowcharts, structured flowcharts, Nassi-Schneiderman diagrams, Perti nets, state diagrams, and augmented transition networks. He found, generally, that each technique was inadequate to represent complete computer programs and program concepts in one or more ways: inability to represent control flow, inability to represent data flow, inability to represent structured program modules, and/or inability to represent complex data structures. In his review as well as the rest of the journal, several attempts at employing interactive graphics in support of software development are reviewed.

Program Visualization (Brow, Carley, Herot, Kramlich, & Souza, 1985) is one such system. Its intent is primarily the display of program dynamics after a program has been developed in some language, and as such, is not a means for actually programming computers. The Omega system (Powell & Linton, 1983) allows user to mix data structure icons and text to program computers, although the textual form clearly predominates. In PegaSys (Moriconi & Hare, 1985), users can develop design diagrams for programs graphically, but cannot develop executable programs directly. PECAN (Reiss, 1984) provides lots of graphical information about a program as it is being developed, including a program listing, its Nassi-Schneiderman diagram, the data-type schema, the program's parse tree, a control flow graph, the execution stack, and user input/output dialog displays; but development is still language oriented, and the system represents no new programming technologies. FORMAL (Shu, 1985) is a forms-oriented, visual-directed application development system, but it is focussed on database definition and manipulation, and still is primarily text oriented. The State Transition Diagram Language (Jacob, 1985) provides state transition diagrams after a program has been developed in a language, and Visual Simulation (Melamed & Morris, 1985) provides rich interactive graphics capabilities for building communications networks simulations but remains limited to that function.

Two systems (one reviewed in *Computer*) represent the closest approach to the invention claimed in this application: Programming in Pictures (PiP, Raeder, 1984) and the Programmer's Apprentice (Rich & Shrobe, 1978; Waters, 1982; Waters, 1985). PiP is based on functional programming (considering computer programs as a nested sequence of function calls) and provides four graphics-based editors: one for freehand drawing of pictures to represent data structures and functions, one for representing data types, one for combining the data structures, and one for combining functions. Data may be incorporated in functions, which may be nested to create computer programs.

The Programmer's Apprentice is a project taking place at the MIT AI Laboratory (Rich & Shrobe, 1978; Waters, 1982; Rich, 1985). The Programmer's Apprentice attempts to capture a plan for the software under development, and uses its knowledge based to automate portions of implementing the plan. In addition, some versions of the Programmer's Apprentice involve programming with diagrams that contain little computer language. The alternative visual programming methods differ significantly from the approach taken here because:

They do not incorporate both data and control flow explicitly.

They have no elemental unit of software such as the Softron, upon which Visual Programming of the present invention is based.

Their diagrams have no layers, as do Softrons in the Visual Programming Environment.

They have no way of nesting and reducing diagrams such as Logical Zoom, described below.

They provide no means for incorporating programming information as early as possible in the software development cycle (as does the process of specialization) to provide for a very flexible means of optimization of executable code.

They do not provide for the creation of new program modules by describing additions to, and especially subtractions from, either modules.

It is therefore a primary object of the Visual Programming Environment of the present invention to provide a clear unambiguous on-screen view of a computer program, to define a systematic mechanism for displaying the data interconnections and functional flow in the program, and to provide a means for automatically creating or modifying the program directly from the screen diagrams so created.

Yet another object of the present invention is the creation of a logical sequence of executable computer instructions expressed by grouping graphical, non-linguistic, descriptions for operators and data.

Still another object of the invention is a computer based work station in which all programming constructs are created by arranging lines and boxes on a display screen.

SUMMARY OF THE INVENTION

The computer based work station for language free development of executable software includes a general purpose computer having at least one central processing unit and at least one block of memory. A graphical display is provided to display information generated by the general purpose computer. Input apparatus is provided so that the user can interact with the graphical display. An automatic storage element is provided to store information used by or produced by the general purpose computer. The computer is under the control of an automatic system resource management software or operating system. The computer is programmed to generate diagrams on the display which are connectable by the input apparatus to generate executable programs.

The fundamental elements of the visual program of the present invention are boxes representing Softrons, the multidimensional, graphical "atom" of programming information. Each Softron includes terminal posts representing the points at which data and control may enter or leave a given module. When the user indicates the desired interconnection of data between boxes, data interface integrity checks are performed, so that it is impossible to connect boxes in violation of mutual data requirements. Since the user may select interconnections and primitive building blocks by standard input devices (light pens, electronic mice, touch screens, keyboard pointers) directly from the screen, programming by this method is reduced to joining standard "building blocks" and indicating how they are to be combined.

BRIEF DESCRIPTION OF THE DRAWING

The invention disclosed herein will be understood better with reference to the drawing of which:

FIGS. 8 and 9 are diagrams summarizing the features offered by visual programming;

DESCRIPTION OF THE PREFERRED EMBODIMENT

Visual Programming is founded upon principles which attempt to capture the best of the evolutionary contributions to software technology as the starting point. The key objectives in the Visual Programming Environment are to provide a clear unambiguous on-screen view of a computer program, to define a systematic mechanism for displaying the data interconnections and functional flow in the program, and to provide a means for automatically creating or modifying the program directly from the screen diagrams so created.

A Visual Program is a logical sequence of executable computer instructions expressed by grouping graphical, non-linguistic, descriptions for operators and data. There is no "computer language" in the Visual Program. All programming constructs are created by arranging lines and boxes on the screen. The lines and boxes control execution flow, define what data is shared among program segments, and indicate what operation is to be performed at each step. The graphical translator converts the diagram directly to the executable computer instructions. The visual representation takes advantage of the natural human ability to assimilate voluminous amounts of information when the information is described in a picture.

The Visual Programming Environment has a rich, structured library of elemental software units, called Softrons, to use as a starting point for development of a computer program. Properties of Softrons will be discussed in detail hereinbelow. For purposes of this discussion, it is sufficient to note that a Softron is a visually displayed bundle of computer program information.

Figure 1:
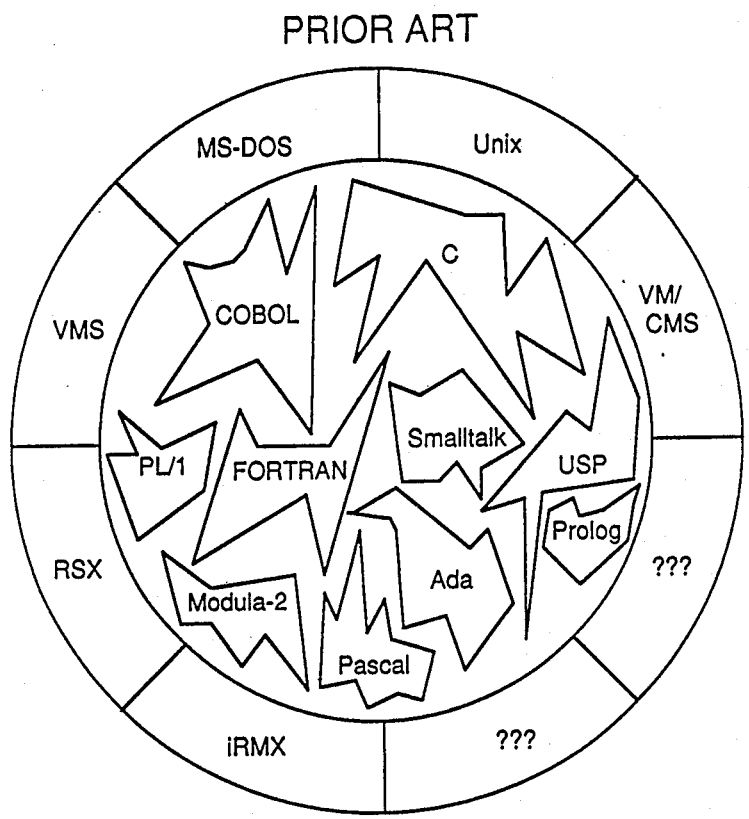
FIG. 1 is a schematic illustration of existing computer languages and applications.
Figure 2:
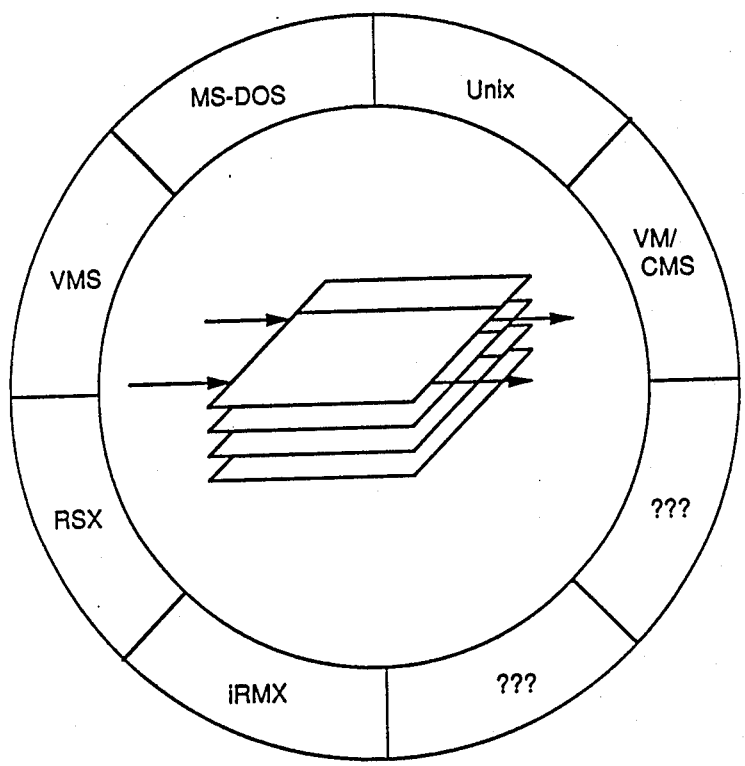
FIG. 2 is an iconic representation of the transformation provided by the present invention.
Figure 3:
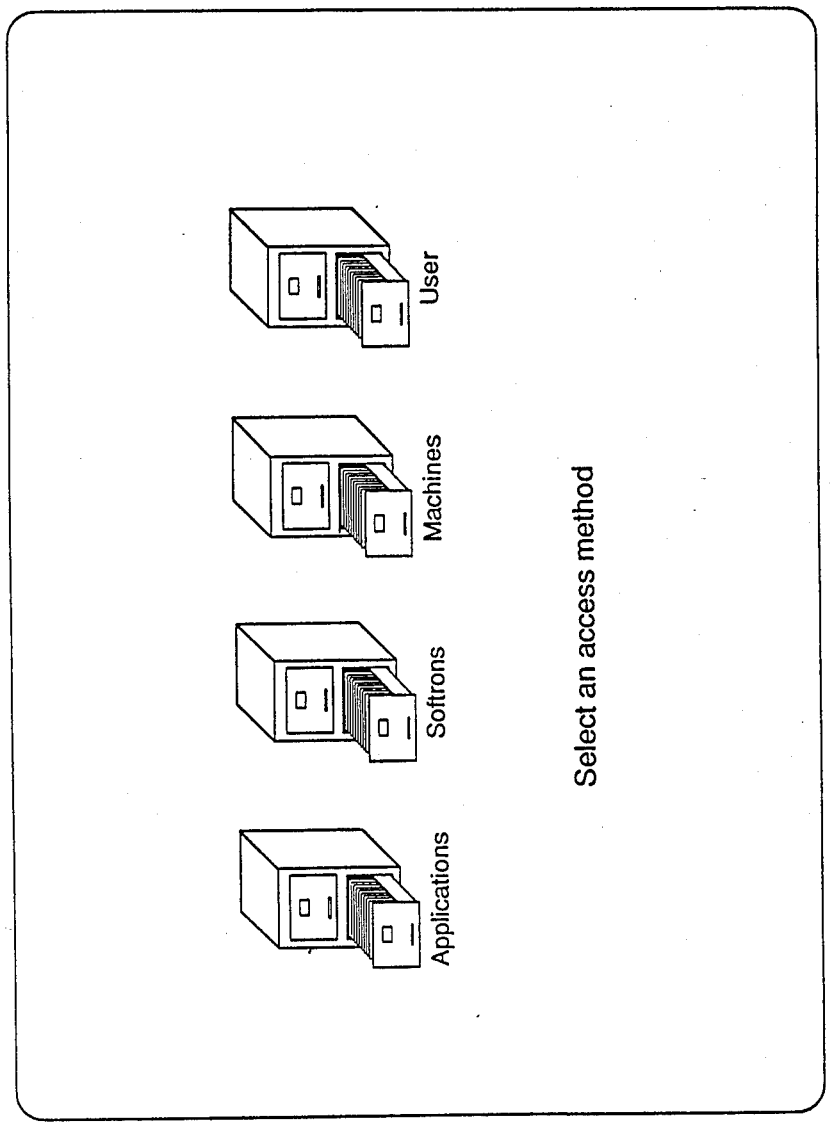
FIG. 3 is a schematic illustration of sample library access options in the visual programming environment.

When the user first begins to create a program at a Visual Programming workstation, he or she will see a screen that allows easy access to the library of Softrons, such as that shown in FIG. 3. In FIG. 3, the user can choose access to the library by application type, by Softron name, by function performed, or by any other convenient means that has been previously defined.

Figure 4:
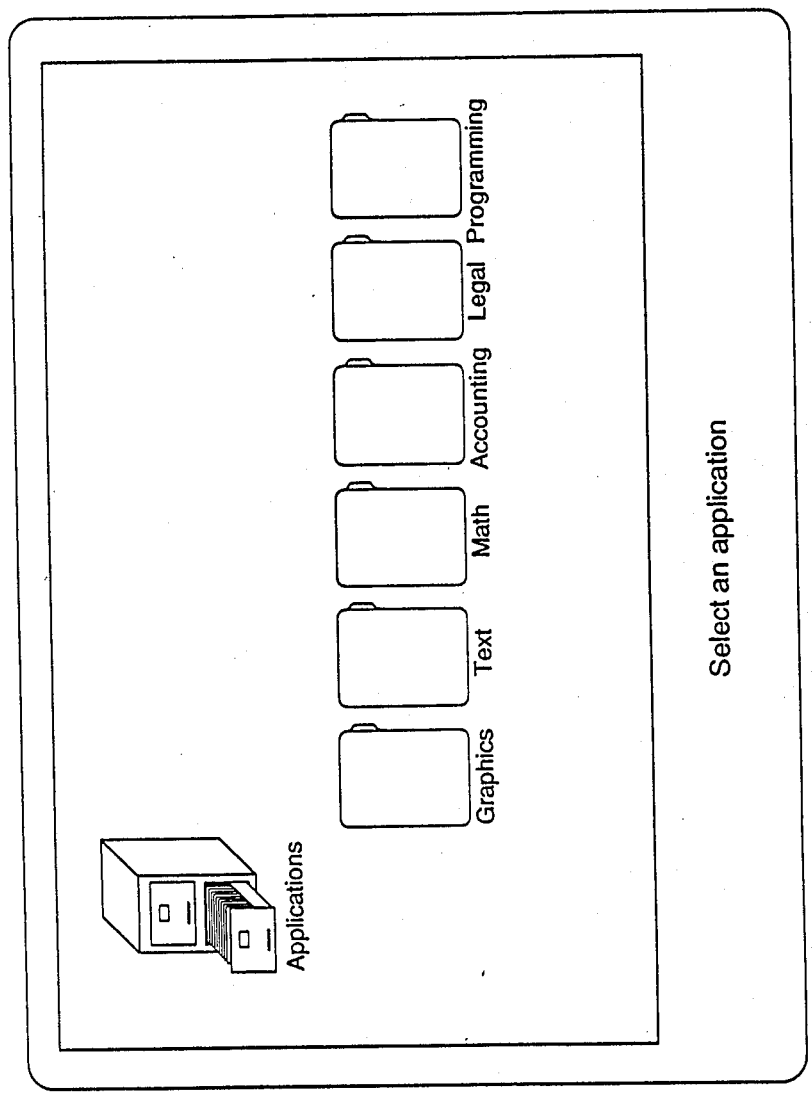
FIG. 4 is a schematic diagram of other applications options in the visual programming environment.
Figure 5:
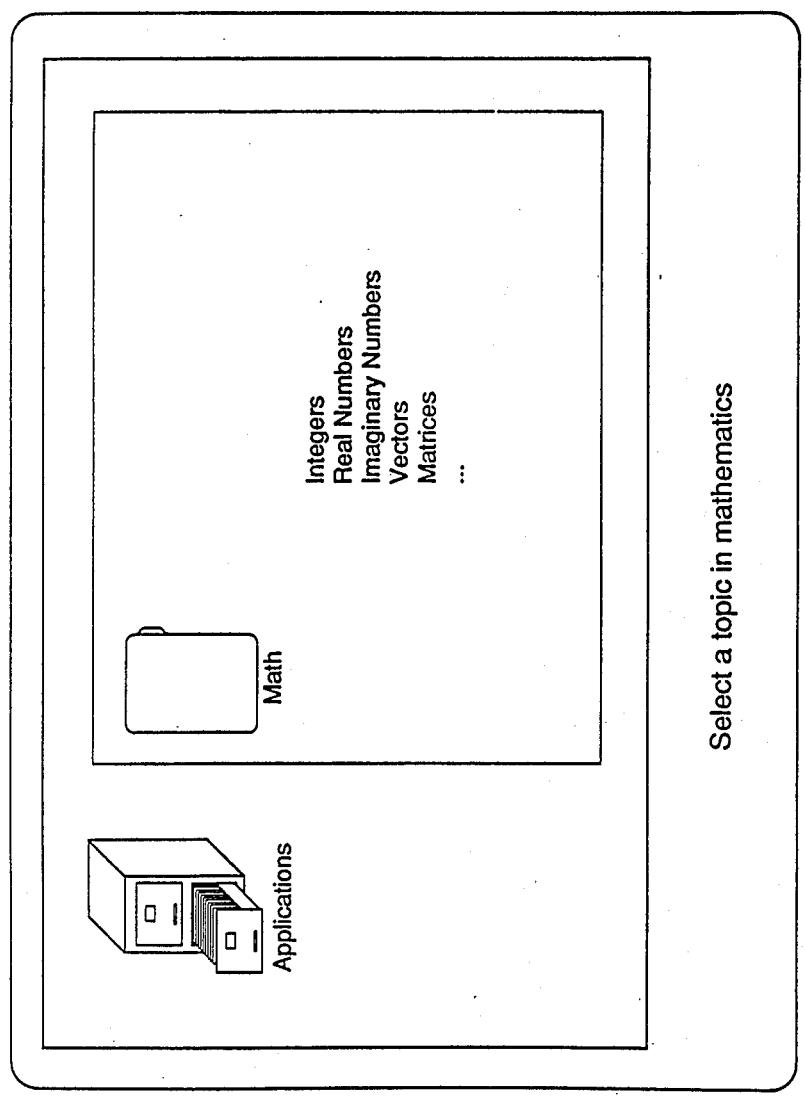
FIG. 5 is a schematic illustration of sample mathematics options in the visual programming environment.

Suppose the user has chosen to access the library by application type by selecting the "Applications" file cabinet with a light pen or mouse. He or she is then shown a list of application types in the library, as in FIG. 4. Further suppose that the user has selected the "Mathematics" file folder icon with the light pen or mouse. Then a list of the Softrons related to mathematics will appear in a window over the file folder, as in FIG. 5.

Figure 6:
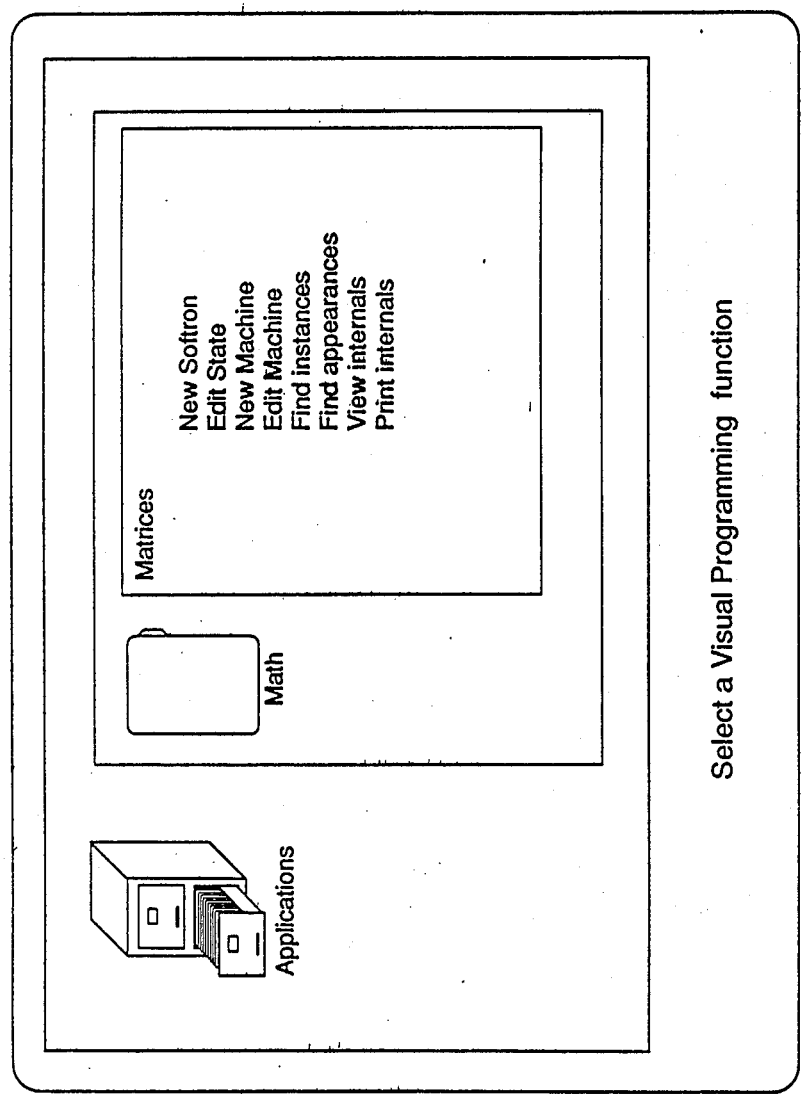
FIG. 6 is a schematic illustration of sample modifications to a matrix in the visual programming environment.
Figure 7:
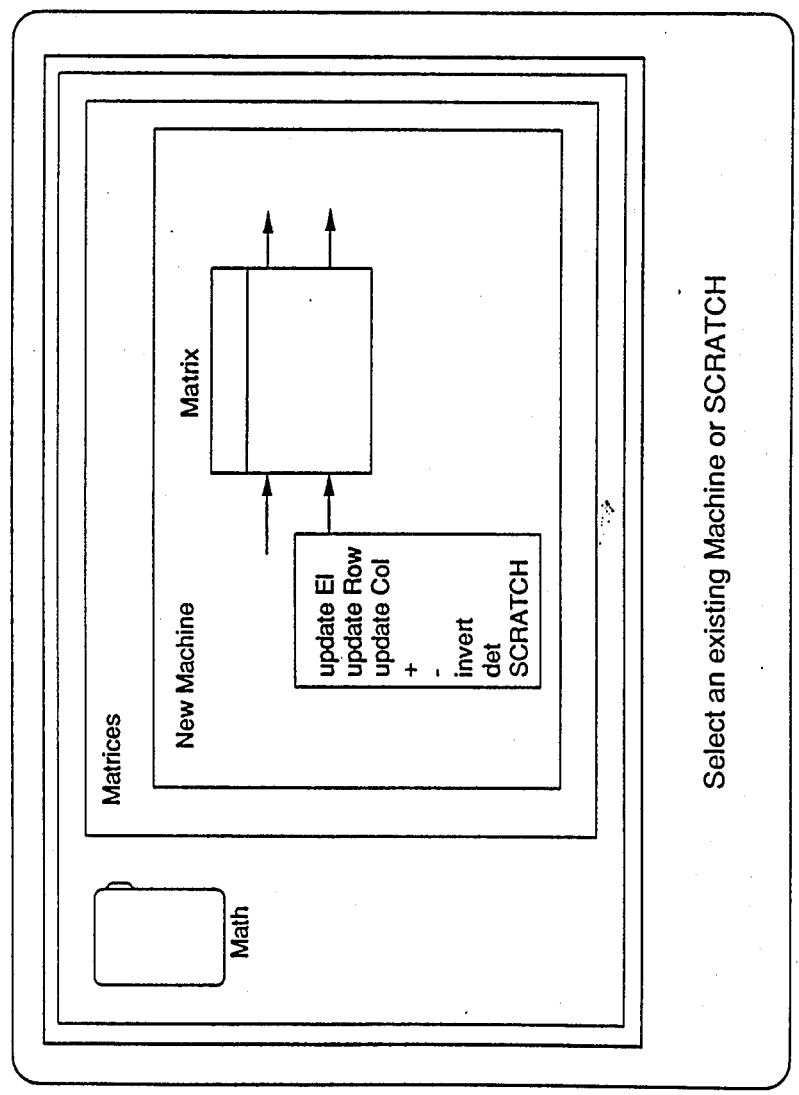
FIG. 7 is a schematic illustration of the building of a new machine in the visual programming environment.

Hereinbelow, the creation of a method for multiplying matrices will be illustrated. In order to utilize the Visual Programming Environment for modifying and extending its abilities to work with matrices, only two more steps are necessary: 1) to select Matrices with the light pen or mouse from the Mathematics options window, after which a Matrix Softron appears on the screen, as in FIG. 6; and 2) to select the Create New option from the Machines options window, as shown in FIG. 7. In general, there is a preferred sequence of feature selection after the Softron of interest has been identified or created, and this sequence will be discussed in detail after the components of Softrons have been presented.

The fundamental elements of the Visual Program are boxes representing Softrons, with terminal posts representing the points at which data and control may enter or leave a given module. When the user indicates the desired interconnection of data between boxes, data interface integrity checks are automatically performed, so that it is impossible to connect boxes in violation of mutual data requirements. Since the user may select interconnections and primitive building blocks by standard input devices (light pens, electronic mice, touch screens, keyboard pointers) directly from the screen, programming by this method is reduced to joining standard "building blocks" and indicating how they are to be combined.

At execution time Visual Programming offers distinct advantages in terms of visibility of operation. At the user's request, as the program runs, execution paths are highlighted on the screen to illustrate which are taken. The user is thus wholly aware of how results from a program module are generated. All data lines are directly accessible in the test mode, so the user may ask to see data passing to and from any module. This leads to quick verification of proper program operation and to quick fault isolation.

Control of the sequencing of the primitives is visibly maintained. The discussion above on data flow graphs implies that explicit flow of control lines, directing which execution paths are to be taken, are unnecessary for the development of computer programs. Nevertheless, it is our feeling that it is very natural for users to have a sequential operation view of program structures and to have direct control over it.

A summary of the features offered by Visual Programming in comparison to other approaches may be found in FIGS. 8 and 9. Clearly no approach can offer very many of its advantages. There is little doubt that Visual Programming based workstations will simplify substantially the software development process in the years to come. The inventors believe that Visual Programming will make possible a much more rapid and lower cost software development cycle. In the long term the development and integration of software systems based on Visual Programming will dominate current methods and will become the accepted means by which software is designed, implemented and tested.

We will now describe six major unique aspects of the Visual Programming Environment: *Visual Programming*, the *Softron*, the *layered approach*, the *specialization process*, the *Logical Zoom*, and *inheritance by subtraction*. For each of these six major aspects, a brief description, a discussion of the unique features of the approach, and the summary of the advantages of the approach will be given.

THE VISUAL PROGRAMMING APPROACH

The Visual Programming Environment is a significant advance in software development facilities. The purpose of the Visual Programming Environment is to decrease drastically the time and effort required to develop and maintain high quality computer programs. This will mean higher productivity from existing development and maintenance personnel, lower demand for additional development and maintenance personnel, and an increase in the number of personnel who can effectively program a computer.

Visual Programming involves constructing programs from graphically displayed software units, called Softrons. All Softrons have the same kinds of components, and all programs in the Visual Programming Environment are composed entirely of Softrons. Softrons may be low level entities like number, array, and string or sin, sort, and find character; in practice, they will usually involve higher level units like matrix, relation, and paragraph or invert, join, and reformat. Softrons group data-like structures with functions that operate on them.

In conventional linguistic programming environments, control structures are concepts like "IF-THEN", "CASE", and "LOOP". Control structures in Visual Programming are totally visual and are explicitly visible on the screen; that is, there is no language involved in the control structures, other than names and comments. Nevertheless, all control structures that are possible in language-based approaches are possible in Visual Programming.

All Softrons are based on the same fundamental visual package of programming information on the screen to the user. Softrons and their associated control structures have a definite well-defined visual notation associated with them. An important heuristic in all visual notation is that, for clarity, details may be omitted when no ambiguity results from their omission.

UNIQUE FEATURES OF VISUAL PROGRAMMING ARE:

The Visual Programming Environment offers computer support for the on-screen creation of software design diagrams.

Visual Programming offers direct execution of the software design diagrams so created. The difference between Visual Programming and the other approaches is that *there is no coding phase* once the diagrams are complete.

The Visual Programming Environment is totally language free. Words are used to label Softrons and portions of Softrons, and are used for comments. Statements in computer language never need be entered by the user, and a language translator never need be invoked, unlike all other known approaches. Of course, pre-existing modules that were developed in a computer language may be linked with Visual Programs.

Visual Programming is multidimensional. Although programming languages have a tree-like syntax structure, they are basically unidimensional methods. Visual programming offers several explicit dimensions, including the height, depth and width of figures on the screen.

Control and data flow lines are explicitly visible on the screen in the "source code" of Visual Programming, unlike any language based approach.

These unique features add up to advantages that, taken together, provide an unprecedented opportunity for rapid development and maintenance of high quality computer applications. Because the "source code" is a set of screen graphics rather than language statements, and because several dimensions are available to the user, the user's mental effort required to program any particular portion of the application is greatly lowered. For skilled users, this means that much less time will be spent in "housekeeping" and other mechanical chores, and that the entire coding phase can be omitted, since they typically develop design diagrams anyway; the developer's time will be spent specifying, designing, and testing the system. For novice users, much more sophisticated applications will be within reach, for many of the same reasons. There will also be a new class of developers, who were baffled by computer languages (or who simply do not speak English) who will immediately grasp the meaning of the executable diagrams in the Visual Programming Environment.

THE SOFTRON

Figure 10:
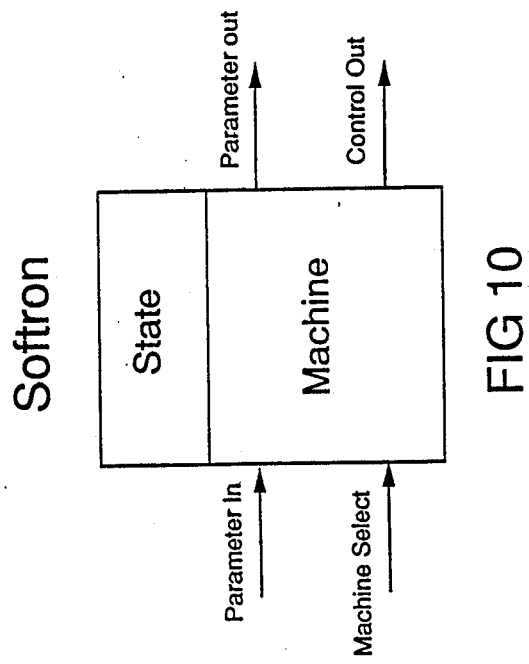
FIG. 10 is a schematic diagram showing the visual appearance of a generic SOFTRON according to the present invention.

The Softron is a carefully constructed visual concept whose features are determined by the need for a language free programming method and for layers, specialization, and Logical Zoom, to be discussed subsequently. It is an elementary software "particle" in Visual Programming. A Visual Program is a set of Softrons connected by parameter and control lines. Softrons are therefore program modules that take parameters and perform some calculation. In this, they are like subroutines, functions, and procedures in conventional programming languages. Softrons also have the ability to preserve important aspects of the history of the parameters they have been given. In this, they are like data structures. Softrons further have the ability to perform more than one calculation on the same set of preserved information, and in this, they resemble the objects of object oriented programming. FIG. 10 shows the visual appearance of a generic Softron, to whose component parts we now turn. By convention, Softrons are identified on top: here, the generic name "Softron" is shown.

Figure 11:
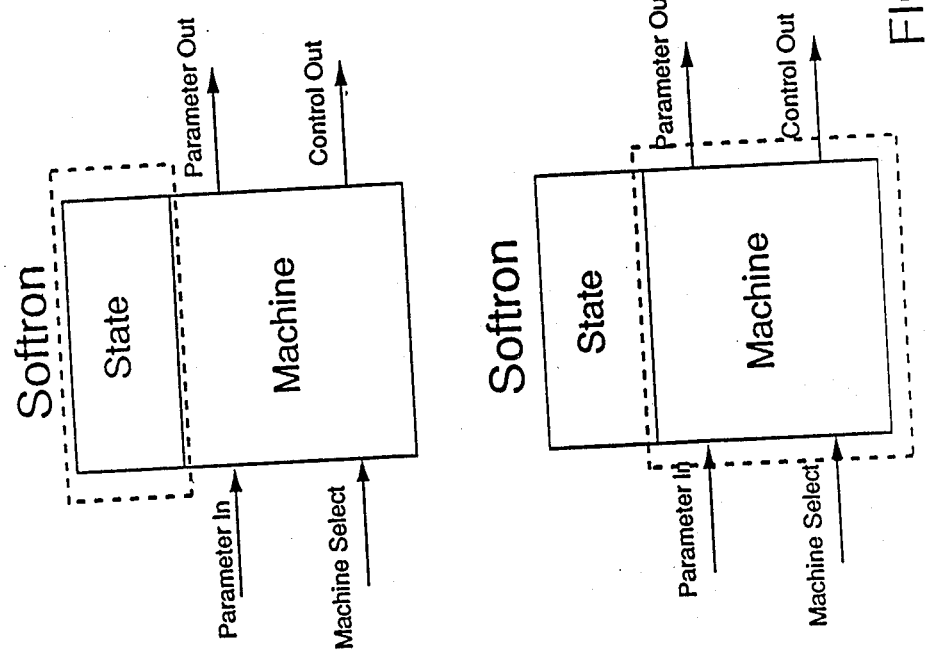
FIG. 11 shows the state and machine portions of the graphic representation of a SOFTRON.

There are six relevant aspects of a Softron. The information preserved between "calls" to it is called its State. Its State is a set of Softron variables (defined by the developer) whose values depend on the way the Softron was initialized and on the history of "calls" to it. A "call" to a Softron is a request to perform some calculation based on the value of the State and/or the value of parameters fed to it, and the particular request is called the Softron's Machine. A given class of Softrons may have many Machines. FIG. 11 shows the State and Machine portions of the graphic representation of a Softron.

Figure 12:
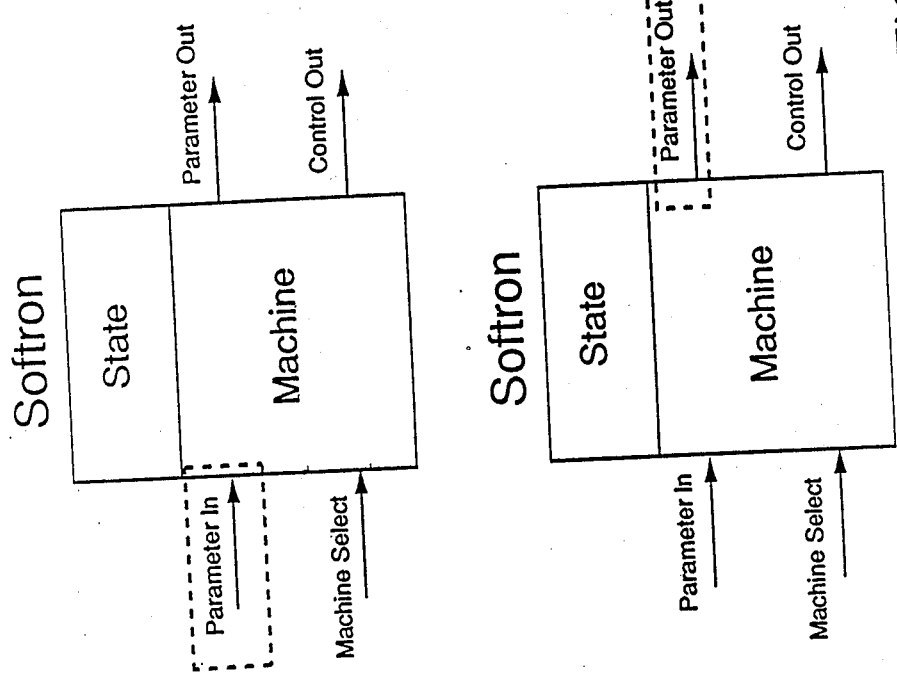
FIG. 12 illustrates parameter in and parameter out lines.

Parameters may be passed to the Softron via the Parameter In line. Parameters are always other Softrons. The specific parameters passed, if any, depend on the Machine selected in the receiving Softron. If the Softron will provide any results (again, in the form of Softrons) as parameters to other Softrons, they flow out the Parameter Out line. The nature of the Parameter Out line is also determined by the machine that has been selected. FIG. 12 shows the Parameter In and Parameter Out lines. If a Parameter In or Parameter Out line is not used in a machine the user has selected, that line simply does not appear on the diagram.

Figure 13:
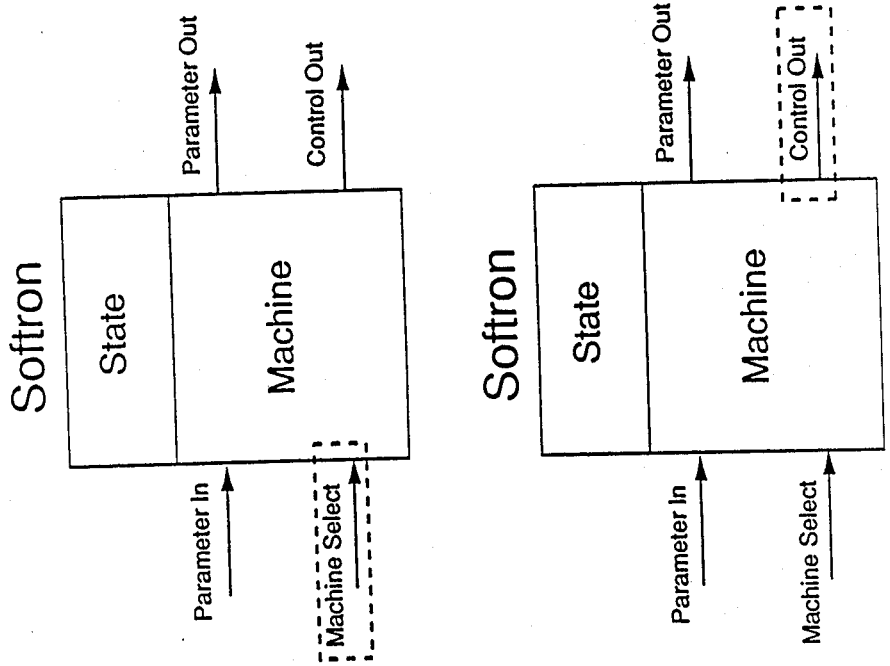
FIG. 13 shows the machine select and control out portions of a SOFTRON.

Control flows into the Softron on the Machine Select line. (The Machine Select line also determines which of the available Machines will operate on the State and incoming parameters, and its label appears when the user has selected or created a machine for the Softron). When control enters the Softron, execution of the Machine begins, and if the user requests, this fact is highlighted on the screen when it occurs. Normally, control leaves the Softron on the Control Out line. In some cases, control will not leave this way, but instead will "go back the way it came" via the Machine Select line. This happens when there is a Boolean (true or false) condition to be evaluated in the Machine (like an "IF" construct) and the condition is false. Control then backtracks until it finds another path to follow. Again, on user request, this fact is highlighted on the screen when it occurs. FIG. 13 shows the Machine Select and Control Out portions of a Softron.

Figure 14:
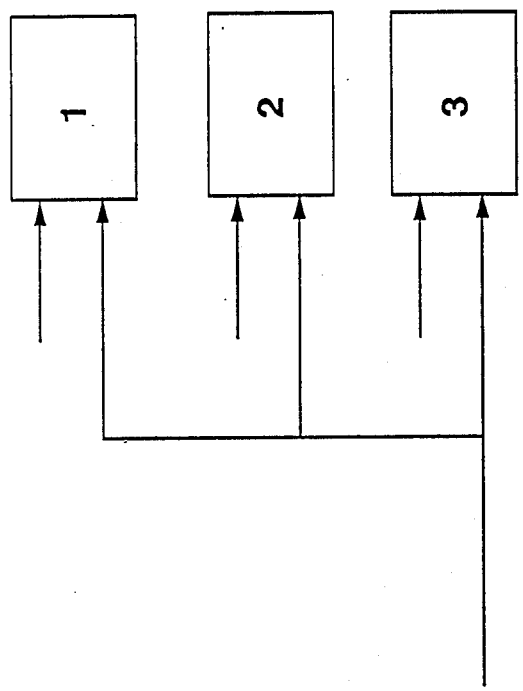
FIG. 14 illustrates a branching control line.

There are conventions that determine when another path has been found. In the forward direction (left to right), when control lines branch out into several lines, the top line is always taken first. If control should backtrack to that junction, control then takes the next lower line, and so on, until there are no lower lines. When there are no lower lines, control backtracks even further. FIG. 14 shows a branching control line, with the sequence of "calls" shown inside the Softrons (1 is first, 2 is second, and 3 is last).

Figure 15:
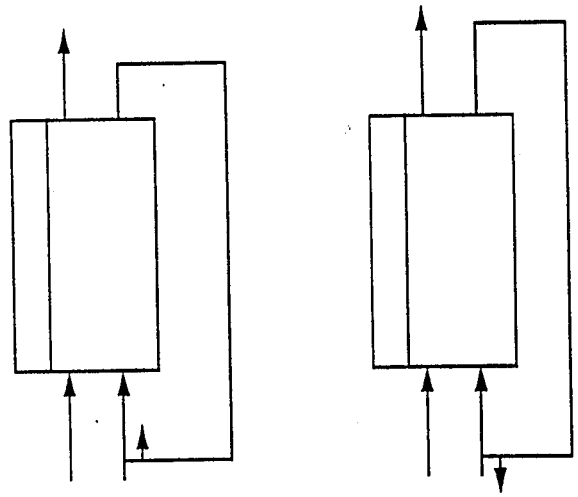
FIG. 15 illustrates two control line connection options.

Sometimes control lines are connected from a Softron on the right hand side of the screen to a control line to its left, against the normal direction of control flow. When this happens, the user indicates whether control should continue to the left or to the right with a terminating arrow in one direction or the other. FIG. 15 shows the two possibilities.

In using a Softron in a Visual Program, the user normally follows a defined sequence. First, he or she selects (or if necessary, creates) the Softron itself. This results in the labeled Softron appearing on the screen with unlabeled parameter and control lines. Next, the user chooses the Machine to be invoked, and the Machine's label appears on the Machine Select line. As mentioned above, the Machine selected determines the number and nature of the parameter lines, so labeled Parameter In and Parameter Out lines also appear at this step. If one or more Parameter Out lines will not be used, the user indicates this fact, and they disappear. If any of the Parameter In lines will be specialized (a process described below), the user indicates this fact, and it is indicated on the screen. Finally, the user connects the parameter and control lines with other Softrons. If any of the connections are illegal, the user is told about it and given options to correct the situation. In some cases, the identity of the Softron and/or the identity of the machine will be determined at run time; when this is the situation, it is not possible to follow this sequence completely, so the user follows the sequence as far as possible, skipping steps when necessary and legal.

Figure 16:
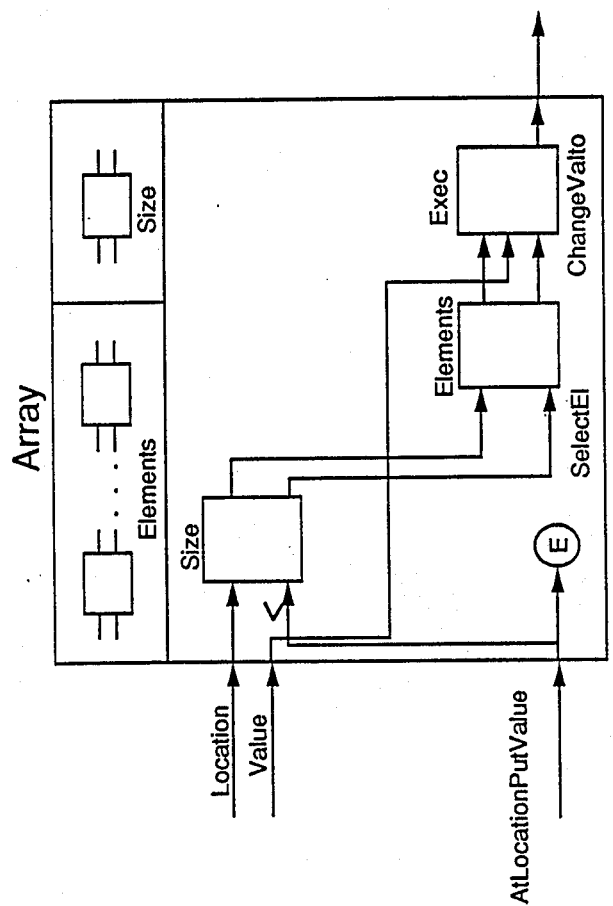
FIG. 16 illustrates the appearance of a display device after the user has selected an array SOFTRON.

To put these concepts together, an example is in order. FIG. 16 shows the appearance of the screen after the user has selected an Array Softron, and has selected a Machine which will put a value parameter at a given location (also supplied as a parameter) in the array. In this case, the user wants the single Parameter Out output (the updated Array).

Figure 17:
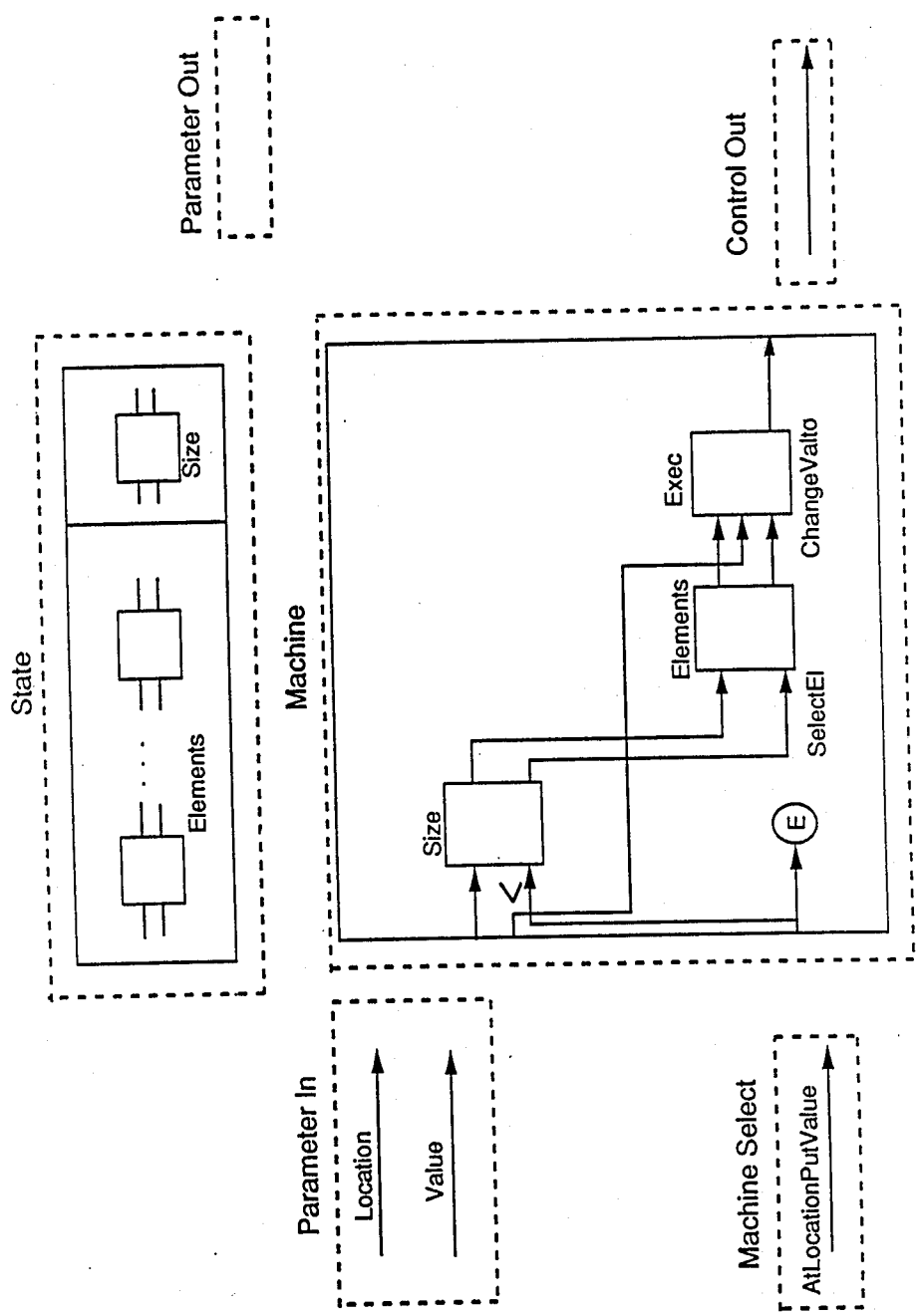
FIG. 17 shows the six SOFTRON components of the example of FIG. 16.
Figure 18:
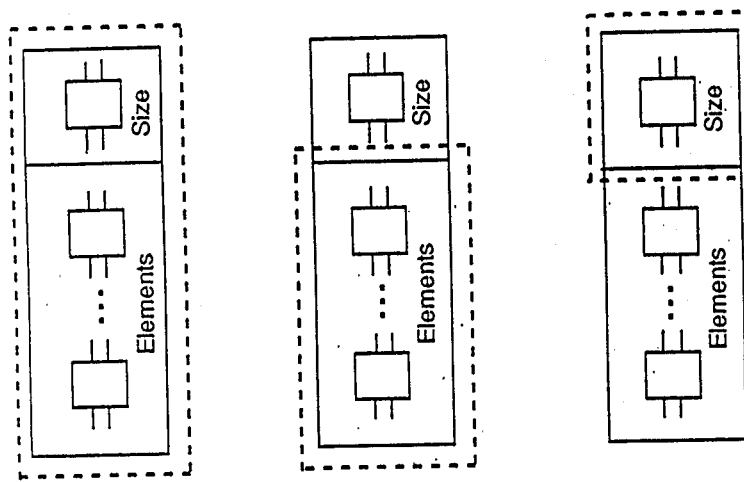
FIG. 18 describes the state variables.
Figure 19:
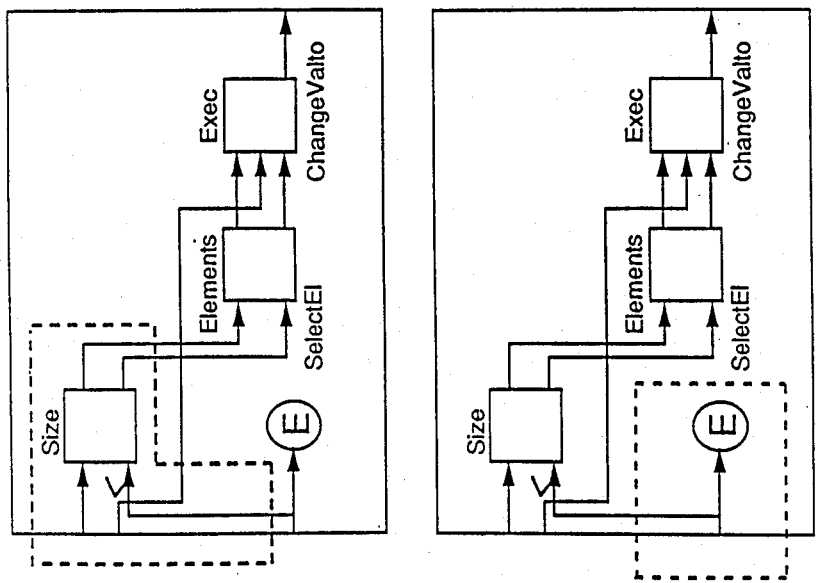
FIG. 19 describes both parameter and control lines.
Figure 20:
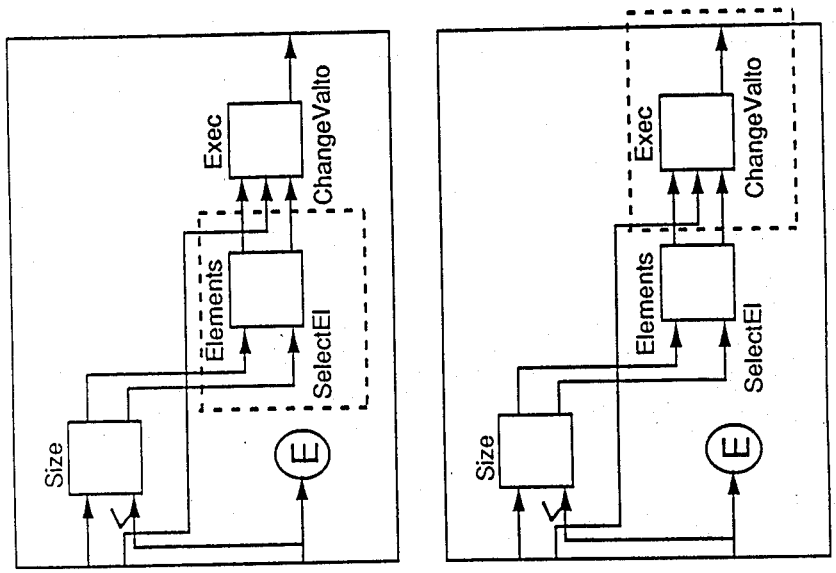
FIGS. 20 and 21 explain the machine for this example.
Figure 21:
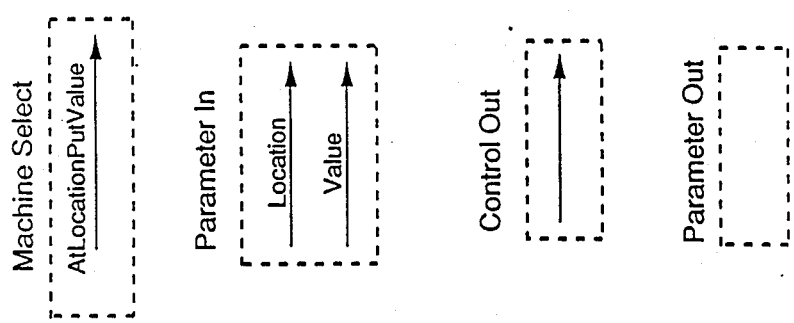

FIG. 17 shows the six Softron components of this example. FIG. 18 describes the State variables, and FIG. 19 describes both parameter and control lines. The Machine is explained in FIGS. 20 and 21. The "AtlocationPutValue" machine will typically be supplied by the library in the Visual Programming Environment since it is so primtive; it is shown here to provide a simple example. Below there will be examples where the user must create the machine.

UNIQUE FEATURES OF THE SOFTRON

Softrons provide the simplest known way to bundle together all information necessary to create a module of software. The Softron reduces the number of necessary types of such bundles to exactly one, and is even simpler than the simplest existing linguistic technique.

Users can arrange for Softrons to deliver parameters in a variety of states of specification.

Softrons, and their associated parameter and control lines, provide an explicit, on-screen view of the interconnections among program components.

The Softron's features provide a way to represent computation graphically and nonlinguistically.

THE ADVANTAGES OF SOFTRONS

The fact that everything in Visual Programming is a Softron means that users will only have to master the components of Softrons to master the Visual Programming Environment.

Providing an explicit view of the interconnections of program components greatly aids program comprehension, leading to faster development and maintenance.

The features of Softrons have been designed to be compatible with the concepts of specialization, Logical Zoom, and layers, which are discussed below.

LAYERS

There are four distinct functional layers to a Softron: the Normal layer, the Initialization/Reset layer, the Error layer, and the Input/Output layer. The reason for using layers is that each of these modes is distinct, and clarity is served by separating them. All programs in each layer are created from Softrons.

Each layer is related to, but programmed separately from, the others. The method for programming each layer is identical. When programming layers, the user may switch from layer to layer of a Softron by a simple request. Run time transitions from layer to layer are indicated by a circle with a symbol for the destination layer inside, as in FIG. 19.

Layers are synchronized by Softrons. That is, by default, all Softrons that appear on the Normal layer appear in all the other layers, forming a basis for editing the others. To avoid the potential confusion of novices having to program four layers, sensible defaults are provided in the Initialization/Reset, Error, and Input/Output layers. In a simple application, the novice user may never program any layer but the Normal. Advanced users will be able to create sophisticated applications in a simple and elegant way by overriding the defaults appropriately.

Figure 22:
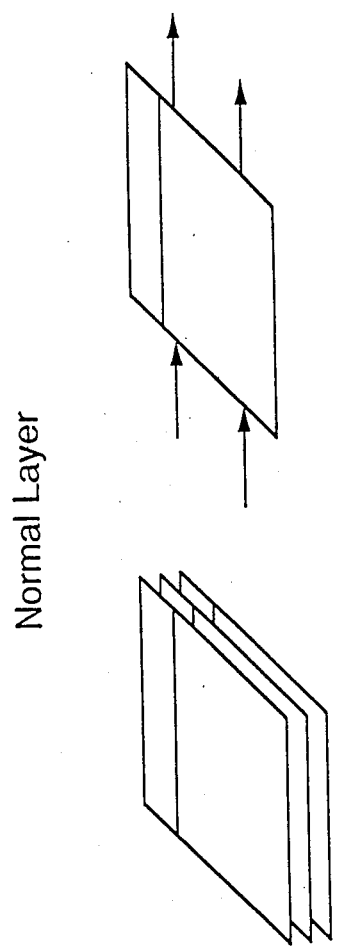
FIG. 22 illustrates the normal layer, the primary applications layer.

The Normal layer, shown in FIG. 22, is the primary applications layer. It is the layer the developer will work with to create the main functionality of the application. A copy of the code on the Normal layer is available to the user on all other layers. It is used as a beginning of the code to be developed on them.

Figure 23:
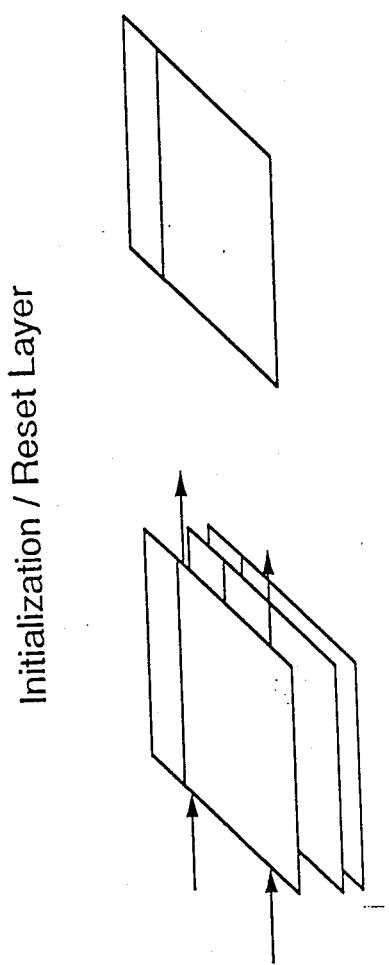
FIG. 23 illustrates the initialization/reset layer.

The Initialization/Reset layer, shown in FIG. 23, stores information about the State of the corresponding Softron in the Normal layer. At run time, when a Softron is first invoked on the Normal layer through its Machine Select line, this layer performs any necessary initialization. From time to time, Softrons on the Normal layer can request that their State values be stored. Very sophisticated fault tolerant systems can be built using this technique.

Figure 24:
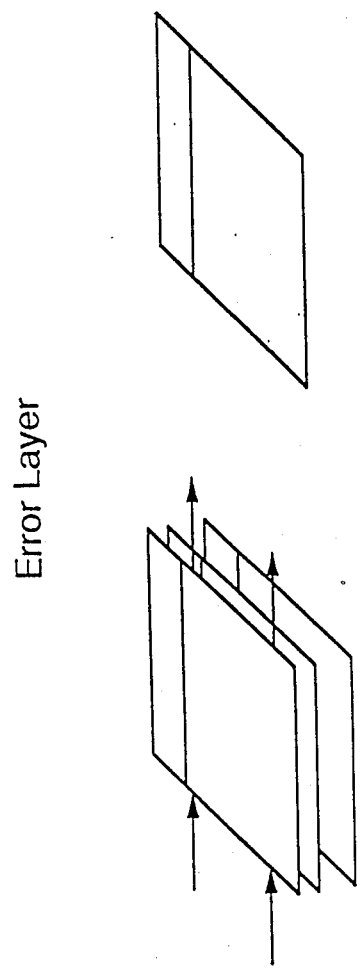
FIG. 24 illustrates the error layer.

FIG. 24 shows the Error layer. This layer is expressly for the purpose of providing an independent mechanism for trapping and recovering from errors.

Figure 25:
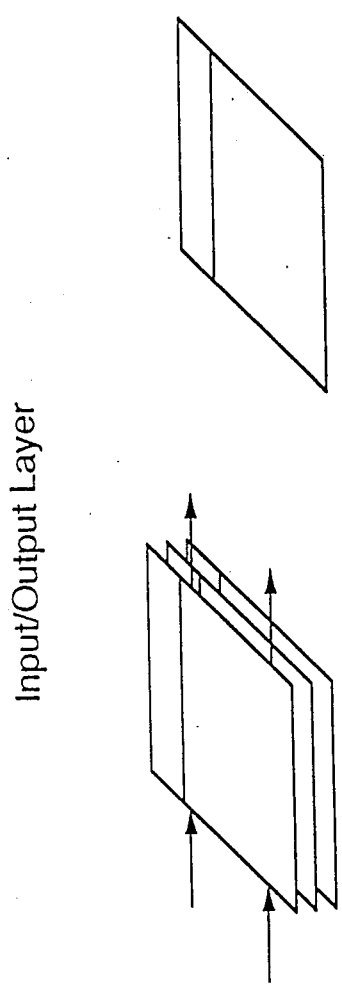
FIG. 25 illustrates the input/output layer.

The Input/Output layer is used primarily for screen outputs to and various inputs from the user, although it can also be used for input and output to devices such as printer, disk, and communications network. It can also be used as a layer providing input to and output from a foreign computer program on the same or a foreign machine. This layer may be seen in FIG. 25.

UNIQUE FEATURES OF LAYERS:

Visual Programming provides obvious points (Softrons) with which to coordinate the layers.

Visual Programming is the only approach with a graphic representation of layers.

ADVANTAGES OF LAYERS:

The Normal layer is uncluttered with potentially complicated initialization/reset, error, and input/output code. These layers, in turn, do not complicate each other. The net result is a visual and conceptual simplicity of the screen, even for complex software applications.

Synchronization of all layers is simple since all layers receive copies of the Softrons on the Normal layer.

Innovative application user interface approaches are feasible and reasonably simple to implement.

The defaults provided for the three lower layers make their use transparent to novices; novices may never view any layers other than Normal on the screen.

SPECIALIZATION

Specialization is the process of taking advantage of all information about a Softron's parameters that is known at development time. This information is used to optimize the program thereby increasing execution speed, and to reduce the number of classes of Softrons stored in the library.

Figure 26:
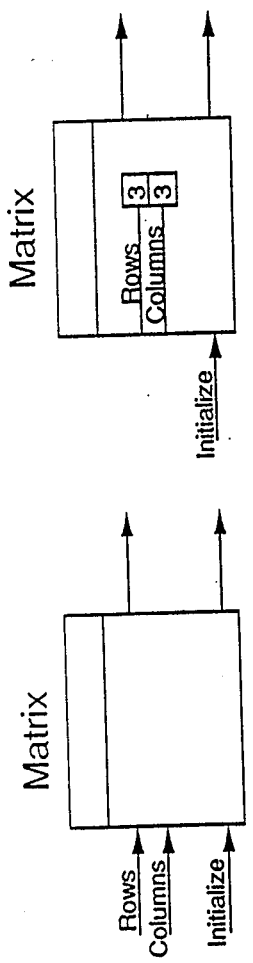
FIG. 26 shows the screen appearance of a matrix SOFTRON that has been specialized.

In the simplest cases, a parameter to a Softron is known to be a constant. FIG. 26 shows the screen appearance of a Matrix Softron that has been specialized because this instance of Matrix is known to have 3 rows and 3 columns. Notice that the Rows and Cols lines in the figure are attached to the Softron where they would have been if they had been parameters, but that they appear inside the Softron rather than outside. This is the visual representation for specialization. No arrows appear on the line attaching the specialized parameters to the Matrix Softron because there is no "flow"; the row and column constants are simply given.

Figure 27:
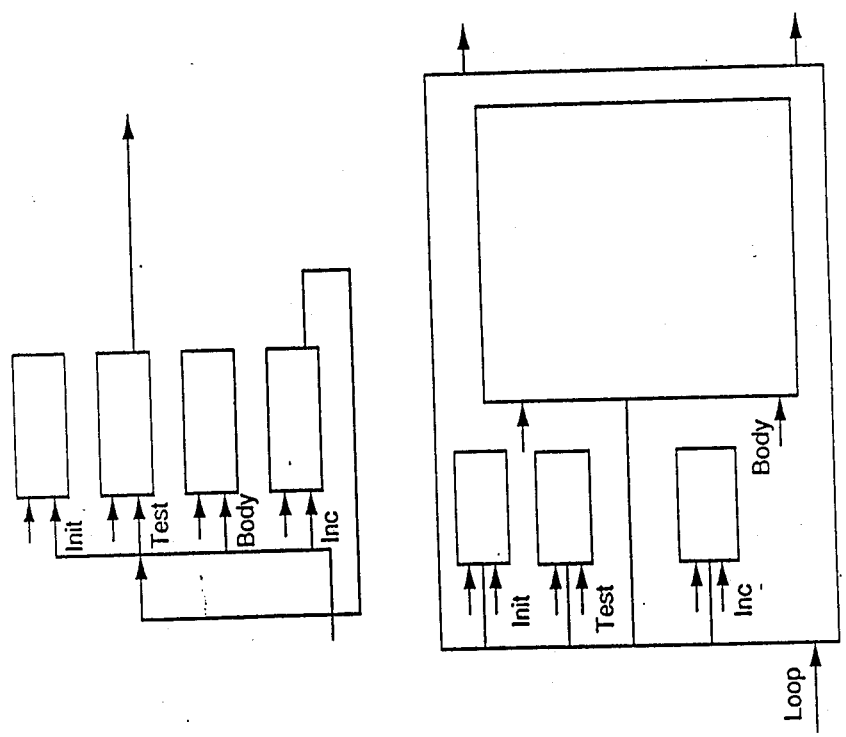
FIG. 27 shows both a loop machine and a SOFTRON.

The specialization need not be a constant. For instance, when constructing an iteration structure, the desired actions for initialization, test, loop body, and loop increment are generally known. Hence, these actions, normally specified as a Softron with a machine selected, may appear as parameters to a Softron that has a loop Machine. FIG. 27 shows both a loop Machine, as it appears with the conventions discussed above, and a Softron with an equivalent loop Machine selected, but where the parameters have been specialized. In general, workstation users will find it more convenient to use the specialized loop Machine.

Figure 28:
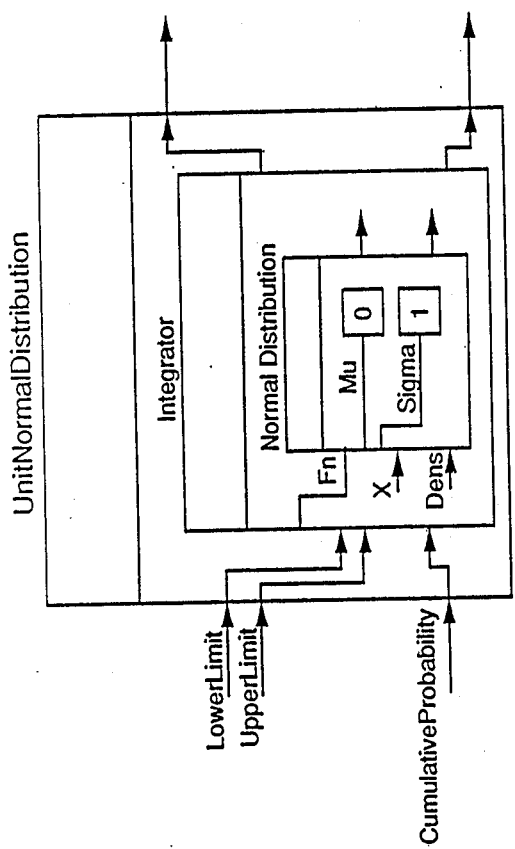
FIG. 28 illustrates a SOFTRON which calculates the cumulative probability between two limits for the unit normal distribution.
Figure 29:
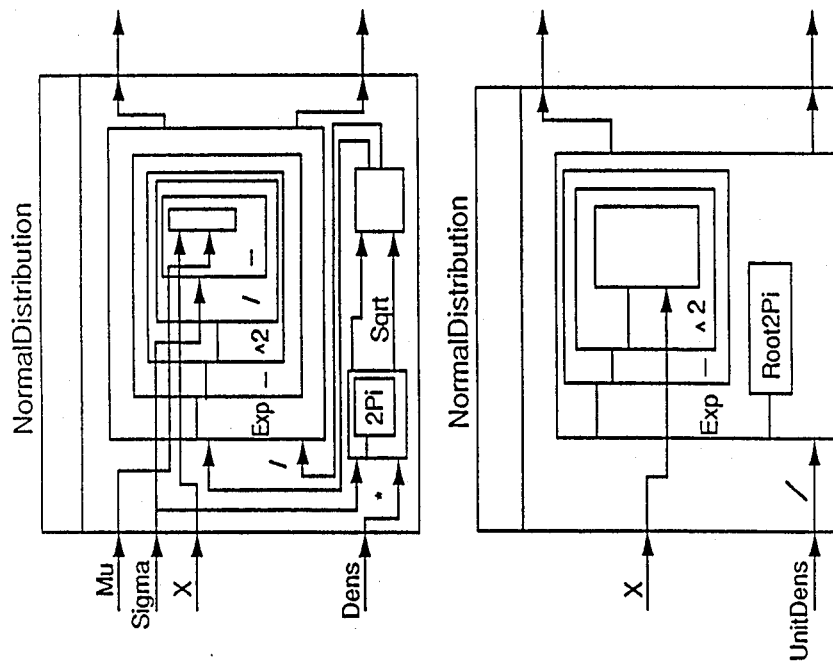
FIG. 29 shows the normal distribution's dens machine before and after specialization.

FIG. 28 shows a Softron which calculates the cumulative probability between two limits for the Unit Normal Distribution. Inside this Softron is a Normal Distribution Softron with the Dens (probability density) Machine selected and with Mu (the mean) specialized to 0 and Sigma (the Standard deviation) specialized to 1. The effects of this specialization actually change the NormalDistribution's Dens Machine inside the UnitNormalDistribution's CumulativeProbability Machine. They have no effect on the NormalDistribution's Dens Machine outside the UnitNormalDistribution's CumulativeProbability Machine. FIG. 29 shows the NormalDistribution's Dens Machine before and after specialization. It is obvious from a glance at the screen diagram that much less code will have to be executed in the specialized case.

UNIQUENESS OF SPECIALIZATION

Users may specify all information known at development time for the purpose of specialization.

The full power of the Visual Programming Environment is available as a kind of preprocessor.

Only one general copy of the modules developed at the Visual Programming workstation need be stored in the library.

ADVANTAGES OF SPECIALIZATION:

Effort and library space are saved because the user needs to store only one version of a Softron or Machine.

Performance optimizations are automatic, thorough, and more global than conventional compiler optimizations. Once a user indicates that a parameter will be specialized, the consequences of the specialization are computed for the entire program, even for primitive Softrons at the lowest level. This means that software developed at the Visual Programming workstation will require fewer computer resources and less execution time than had specialization not been available.

The Visual Programming Environment frees the user from performing a large class of computations which would be necessary in conventional development environments. The user need not ask the application to perform those computations at runtime, either.

Specialization provides a very convenient mechanism for visual "code templates", such as that shown above for the loop Machine.

LOGICAL ZOOM

Logical Zoom is the process of creating a new Machine for an existing Softron, or of creating a new State definition and a new Machine for a new class of Softrons, by grouping together an existing network of Softrons. This grouping (and its inverse) are performed on the screen at the user's request. Three conditions must hold for the Logical Zoom to be legal: (1) only one control line may enter the new machine; (2) if an instance of a Softron is referenced in the zoomed network and is not a parameter, all instances of that Softron must appear in that network; and (3) once the machine is entered, the input parameters for the new machine must be sufficient for the Softron to run to completion—there must be no data or control cycles introduced by the Logical Zoom. The first condition guarantees that a specific Machine is being defined. The second guarantees that the zoomed network is entirely self contained, except for parameters. The third prevents the condition of data deadlock; it is not possible to create a situation where Softron A waits for the results calculated by Softron B while Softron B waits for the results calculated by Softron A, so that no progress is possible. If any of these conditions is violated when the user requests a Logical Zoom, the Visual Programming Environment presents the user with a list of options to correct the violation.

When a network is Logically Zoomed, it becomes a Machine with the same properties as all Machines. In particular, the inner workings of the Machine are not visible to other Softrons unless the visibilitly was explicitly designed in, and the process of specialization is available. When the user performs a Logical Zoom, the screen changes in two ways: the name of the Machine appears on the Machine Select line of the Softron, and the network that defines the Machine disappears. The network, of course, can be made visible again upon request.

Logical Zoom may be approached in an upwards or a downwards direction. The upwards direction corresponds to a bottom-up type of design in that the details of the Machine are created and then grouped together. The downwards direction, similarly, corresponds to a top-down style of design, in that the need for a given machine is identified, but definition (via Logical Zoom) is deferred. Many skilled designers prefer to use a combination of both directions, and they may do so with Logical Zoom.

To get an idea of how Logical Zoom works in practice, consider the creation of a Machine to multiply two matrices. Assume that the Matrix Softron has already been created, and that its State is composed of an Array Softron, a Rows Softron, and a Cols Softron. Similarly, assume a Vector Softron has been defined. In this example, design will be primarily top-down.

Figure 30:
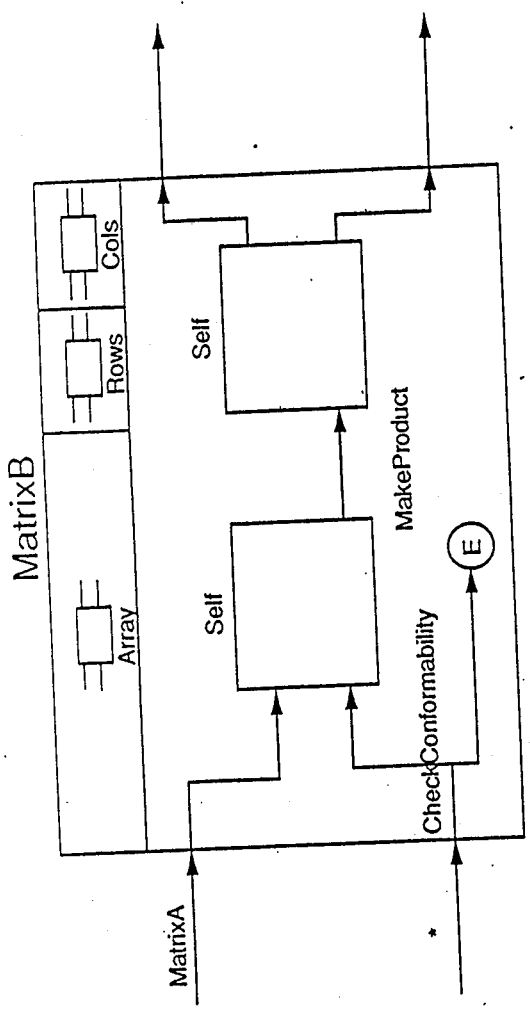
FIG. 30 shows the two basic components of a matrix multiply.

FIG. 30 shows the two basic components of matrix multiply: first, conformability of the matrices must be ensured (the first matrix must have as many columns as the second has rows), and then the product itself must be created. In the Visual Programming environment, creation of a diagram like FIG. 30 is possible even when the CheckConformability and MakeProduct machines have not been defined. "Self" on the screen simply indicates a self reference, which in this case is MatrixB.

Figure 31:
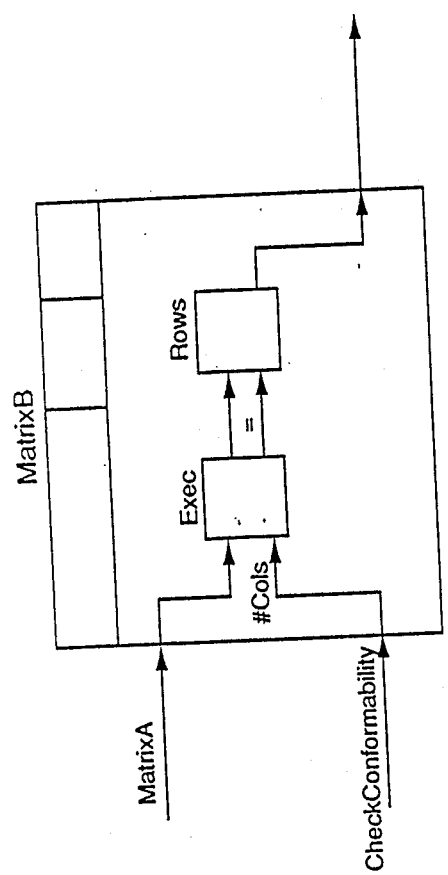
FIG. 31 shows a machine for checking conformability.
Figure 32:
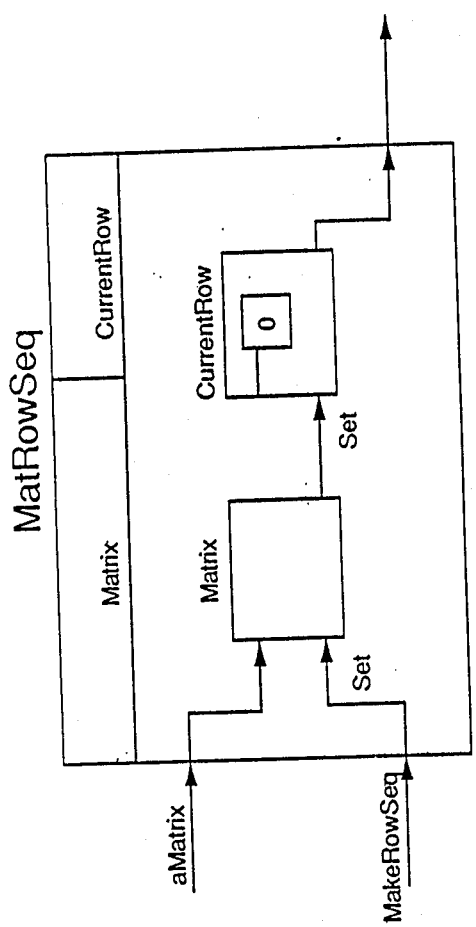
FIGS. 32-35 illustrate the strategy for matrix multiplication.
Figure 33:
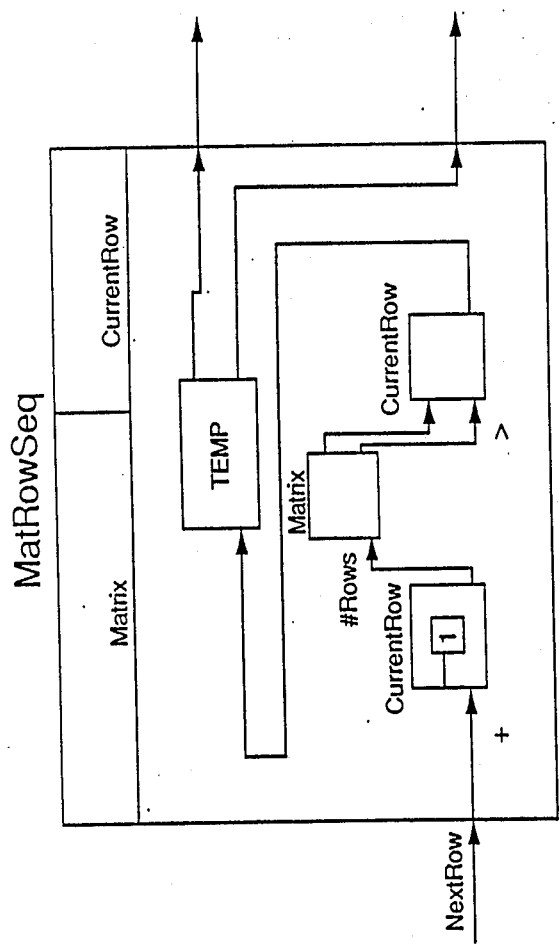
Figure 34:
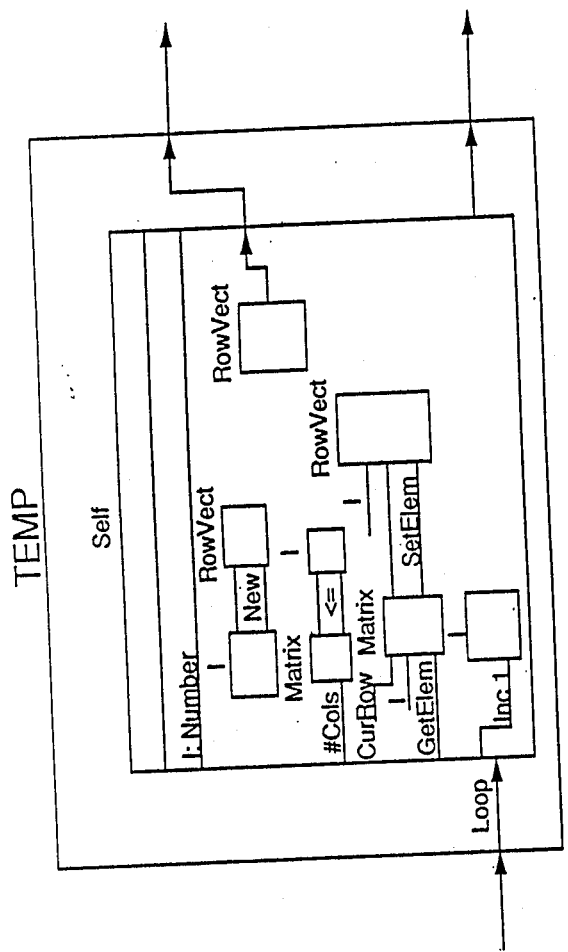

Checking conformability is relatively straightforward, and a Machine to do so is shown in FIG. 31. The creation of a MakeProduct Machine is a bit more complex. The strategy for doing so will be to create a NextRow and NextCol machine for Matrix, a NextElement machine for the row and column vectors that result, and then to produce, multiply, and sum the resulting elements in the appropriate order to yield the product matrix. FIGS. 32-35 show pieces of this strategy.

Figure 35:
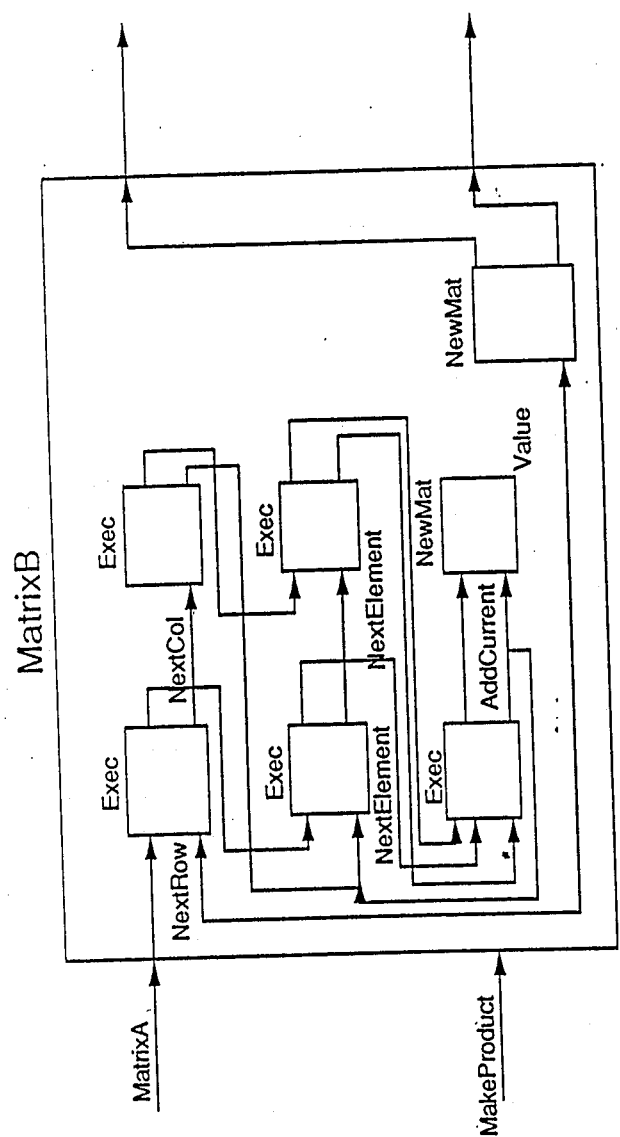
Figure 36:
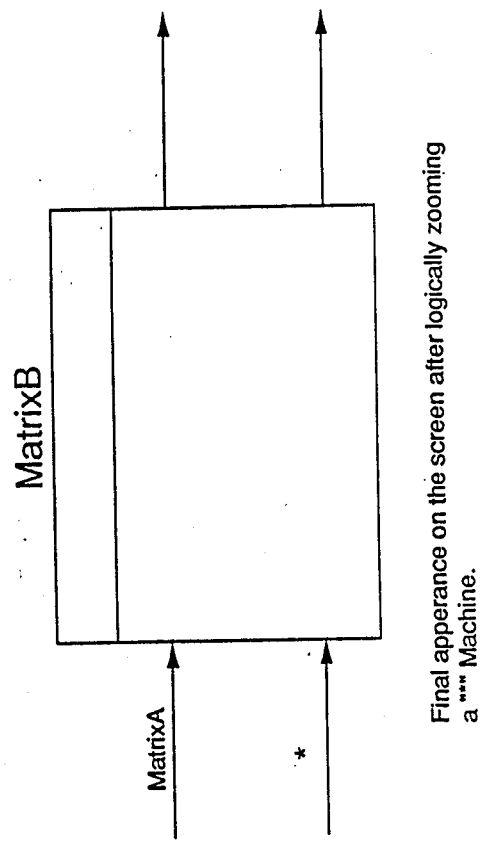
FIG. 36 shows the final appearance on the screen after logical zooming.

Having done this, the user now combines the appropriate Softrons as shown in FIG. 35, which shows a Logically Zoomable machine for MakeProduct for Matrix. After he or she Logically Zooms this machine, it is automatically placed in the appropriate box from FIG. 30, the Machine represented in FIG. 30 is Logically Zoomed, and a Matrix "*" machine has been created. The final screen appearance is shown in FIG. 36.

UNIQUE FEATURES OF LOGICAL ZOOM

In the upwards direction, Logical Zooms are possible because the user can draw a two dimensional enclosure around the network proposed as a candidate for Logical Zoom.

In the downwards direction, any Softron or Machine whose definition is deferred is an extremely uniform and well-understood entity, which the user can define at the time he or she finds most appropriate.

ADVANTAGES OF LOGICAL ZOOM

Logical Zoom creates easily understood entities in a visually intuitive format.

Top-down, bottom-up, and combination approaches are possible.

INHERITANCE BY SUBTRACTION

One attractive feature of several modern software development environments is their attempt to support reusable code, that is, their facilities for employing previously developed software modules in new applications whenever possible. The most common approach to reusable code is a mechanism called inheritance. In inheritance schemes, the programmer chooses a software module from the library and adds additional computer language to describe how the desired module differs from the previously developed one. This means that, to some extent, inheritance reduces much of the programming task to describing differences instead of starting from scratch.

A problem with all existing inheritance schemes, however, is that the "children" modules can only add data and functions to the "parent" modules from whom they inherit. That is, the differences that are programmed are always additions to the modules in the library. This fact has two undesirable implications. First, software modules grow quite unwieldy after several "generations", since each generation can only add to those that came before. This can lead to code that is more wasteful in space and time than is necessary. Second, the relation of parent to child is forced in a particular direction, called "data abstraction": the library of reusable modules is structured so that parents are the "least common denominator" of their children. While the data abstraction is natural in some circumstances, it is unnatural in others.

Figure 37:
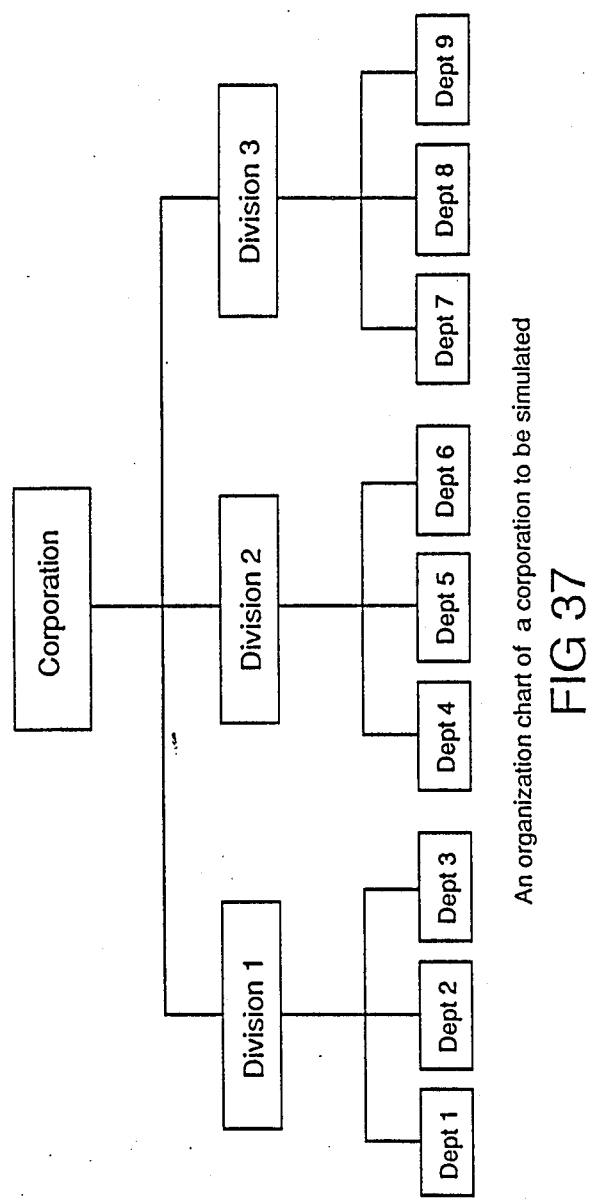
FIG. 37 illustrates a hierarchy of software modules to match an organizational chart.
Figure 38:
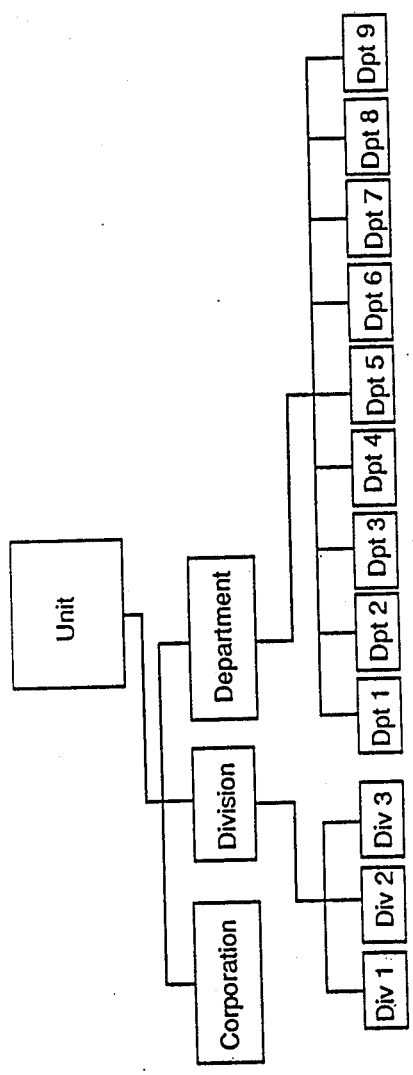
FIG. 38 illustrates a corporation viewed as a data abstraction hierarchy.

For instance, consider a software application that simulates a corporation that has 3 divisions, each of which has 3 departments. If the hierarchy of software modules can match the organizational chart, as shown in FIG. 37, the structure of the program will be quite intuitive. Unfortunately, the data abstraction relation requires that the software modules be arranged differently and somewhat unnaturally, as shown in FIG. 38.

The Visual Programming Environment provides a method to retain all the advantages of existing inheritance strategies while avoiding the pitfalls outlined above: inheritance by subtraction. That is, in the Visual Programming Environment, new Softrons may be created from existing ones by adding *and/or subtracting* State variables and/or Machines. Of course, subtracting State variables or machines from the "child" Softron has absolutely no effect on the "parent" Softron. Eliminating a State variable via inheritance by subtraction means that all Machines that used that State variable (for the child Softron) also have to be eliminated. When this occurs, the Visual Programming Environment notifies the user which Machines will have to be eliminated, and asks for confirmation before actually eliminating them.

An immediate effect is that children inherit from their parent or parents only those aspects that are truly required, leading to software that is more efficient in space and time than would otherwise be possible. A further effect is that any relation between parent and child is possible; each box in the organizational chart in FIG. 37 can correspond exactly to a Softron, and data abstraction need not be enforced. This means that the structure of software applications developed in the Visual Programming Environment, as well as their appearances, can be more natural and intuitive than in conventional environments.

UNIQUE FEATURE OF INHERITANCE BY SUBTRACTION

New Softrons may be created from existing ones by describing how they differ, whether the difference involves adding or subtracting (or both) State variables and/or Machines from the existing Softron.

ADVANTAGES OF INHERITANCE BY SUBTRACTION

Applications developed in the Visual Programming Environment are more efficient in space and time because unnecessary State variables and Machines need not be carried from generation to generation.

Many types of relation between parent Softron and child Softron are possible, leading to an extremely natural structure of the software.

The following topics address technical issues not covered above that are generally of concern to computer scientists interested in new programming languages. Although Visual Programming and the Visual Programming Environment are language free, most of the issues apply.

For many of the issues addressed here, many choices are possible. When this is true, we simply report that set of choices we believe to be best for the Visual Programming Environment.

CLASSES, INSTANCES, AND APPEARANCES

There are three forms of specification of a Softron: its class, its instance, and its appearance. The class of a Softron is analogous to type in languages: it is the kind of software atom involved, such as a generic Stack Softron. Softrons appearing as classes have no values in their instance variables, and must become instances before a Machine can be invoked. An instance of a Softron is a specific, identifiable entity of a given class, such as UserStackA. Its State variables contain values, either by default or because a Machine put a value there. It may be invoked in multiple locations with possibly a different Machine in each location. An appearance is a Softron instance with exactly one Machine selected. Each Softron that is on the screen, in the usual case, is an appearance. In a particular Machine, if it is necessary to push a given Softron onto UserStackA at a particular point, this fact is represented by an appearance of the Softron.

SCOPE

The scope of a Softron is the set of other Softrons to which it is "visible", that is, to which it may be connected on the screen. Softron classes are globally available for maximum flexibility, but instances and appearances are more restricted. The optimal scope will be one that does not make it inconvenient for the user to connect Softrons but which provides maximum insulation between unrelated Softrons. In addition, an appropriate choice of scope will make implementation of the Visual Programming Environment straightforward in a parallel processing architecture. In the system we envision, there will be three classes of Softrons with respect to scope: State variable Softrons, Softrons local to a machine, and Softrons passed as parameters to other Softrons. State variable Softrons obviously must be available to all Softrons in all Machines of that Softron (and to no other Softrons); Softrons local to a Machine must be available only to the Softrons in that Machine; and Softrons passed as parameters must be available only to those Softrons to which they are explicitly connected, except when the scope rules for State variables or Machine-local Softrons apply. Logical Zoom obviously affects the scope of the zoomed Softrons since it encloses previously unenclosed Softrons. When it is desirable to group a set of Softrons together without affecting scope (for instance, to make more room on the screen), the edit zoom is employed. It may prove necessary to introduce a category of Softrons that are globally accessible, but the practice is to be discouraged.

EXTENT

The *extent* of a Softron is its lifetime during execution of the program. Again, there are three categories of Softrons, with differing extent: State variable Softrons, Softrons local to a Machine, and Softrons passed as parameters. As with scope, the optimum extent rules cause no inconvenience for the user but provide insulation between various program components. The inventors recommend that State variable Softrons should last for the lifetime of the Softron in which they are enclosed, that local Machine Softrons should last for the lifetime of the execution of the Machine, and that Softrons passed as parameters should last while between the time the sending Softron finishes executing and the receiving Softron begins executing, at which point their extent rules be identical to machine local Softrons. There are circumstances when longer lifetimes are desirable for Softrons; when this is the case, State variables may be preserved on the Initialization/Reset layer for later retrieval. As with scope, extent is affected by Logical Zoom, for the same reason. Also as with scope, when the effect is not desired, edit zoom is to be employed.

CALL BY REFERENCE/CALL BY VALUE

There are two basic ways that parameters may be passed in programming systems (although there are many mixtures possible): call by reference and call by value. In a call by reference scheme, the actual parameter is passed (or usually its address), so that changes made to the parameter in a called subroutine or function are passed back to the calling subroutine or function. In a call by value scheme, a copy of the parameter is sent, so that changes made to the parameter by the called entity are invisible to the calling entity. Call by reference schemes tend to be more efficient than call by value schemes because a lot of copying is avoided, but are more dangerous because they can produce unintended and difficult to find side effects. The Visual Programming Environment will appear to the user to provide call by value services only; any changes made to a parameter must be returned as a result in order for the change to be noticed outside the Softron responsible for the change; but the Visual Programming Environment may implement parameter passing in the most efficient way, including call by reference. For instance, if a large database Softron is passed as a parameter to another Softron, it will be extremely inefficient actually to copy the entire database, especially if only a minor change is made to it; in this case, the Visual Programming Environment will arrange for a call by reference to the database Softron, but will maintain a list of changes to it, so that the call is virtually call by value. We believe that the Visual Programming Environment, and not the user, should worry about efficiency.

EXTENSIBILITY

Because of Logical Zoom and the inheritance mechanisms provided by the Visual Programming Environment, the software development techniques described in this document are quite extensible; that is, the user can create those Softrons that he or she is most comfortable working with. There is another level of extensibility, however, namely, the visual composition of Softrons on the screen. It would be most convenient if control systems engineers could work with control systems diagrams, if accountants could work with charts of accounts, if communications engineers could work with diagrams of the communicating devices, if simulation developers could work with icons of the entities being simulated, and so on. All this requires is that the appropriate mapping from the six components of Softrons, as presented in this document, to the desired screen graphics be defined. This may require that some of the six components be implicit, but the only strict requirement is that the diagrams contain Softron-like bundles of programming information.

EXTENDED TYPE CHECKING

We envision that the Visual Programming Environment will perform type (i.e., Softron class) checks as early as possible in the software development cycle. When sufficient information is available as the program is being constructed, the user will be notified immediately if there is a type mismatch; if sufficient information is not available, the user will be notified as early as possible at run time. Note that type checking will involve more than simple Softron match/mismatch judgments since conformability decisions may be much more abstract, such as a requirement that a certain parameter be a number or that a State variable be a child of a Collection Softron.

PARALLELISM

Given the scope and extent rules outlined here, it is clear that an appearance of a Softron is a reasonably independent entity, one which could be executed by itself (given that parameters are available) on a single processing element in a parallel processing environment. Because the program typically will have been constructed in many layers using Logical Zoom, the Visual Programming Environment offers a practical solution to a persistent problem in parallel processing architectures: the automatic allocation of tasks to processors. Parallel processing researchers have searched for a method by which the same program (as defined by its source code) could be executed in single processor environments as well as in multiple processor environments with differing numbers of processors, but so far this problem has resisted theoretical solution. The Visual Programming Environment does not provide a theoretical solution either, but the fact that an appearance of a Softron is guaranteed to be wholly executable when parameters are available on a single processor in a multi-processing situation provides a lot of information about appropriate partitions of computing tasks. The fact that Visual Programs typically will involve many logical zooms means that this partitioning information will be available with a wide range of granularities. Thus, the range of number of processing elements covered is wide. This means that Visual Programs will be much easier to adapt to automated schemes.

CONCLUSION

This specification has reviewed Visual Programming itself, the Softron, layers, the specialization process, the Logical Zoom, and inheritance by subtraction. For each, a list of unique features and advantages has been generated. Having reviewed these five areas, several comments are in order.

First, it should be clear that the features of Visual Programming are carefully designed with respect to each other. The particular elements of the Softron depend deeply on the need to be compatible with layers, specialization, and Logical Zoom. Layers would be difficult to synchronize without the concept of the Softron. If Softrons contained only data or only functions, Logical Zoom would not be possible since almost always both data and functions would be zoomed, and the resulting entity would be neither pure data nor pure function. If a given parameter to a Softron had to be entirely data or entirely function, the process of specialization would be severely restricted. Logical Zoom, specialization, and layers would be substantially more difficult if the parameter and control lines were not visible and explicit on the screen. All of these features are made possible because Visual Programming is entirely language free, and no other general purpose programming language has been able to achieve this goal.

Second, the approach made possible by the Visual Programming Environment, as outlined here, is quite different from conventional approaches. It is not just another graphics package, fourth generation language, or object oriented approach. It offers significant opportunity to simplify the way the world creates software.

Third, although the graphical atoms have been represented as planar in this disclosure, they can be represented as three dimensional solids when appropriate display technology is available.

Figure 39:
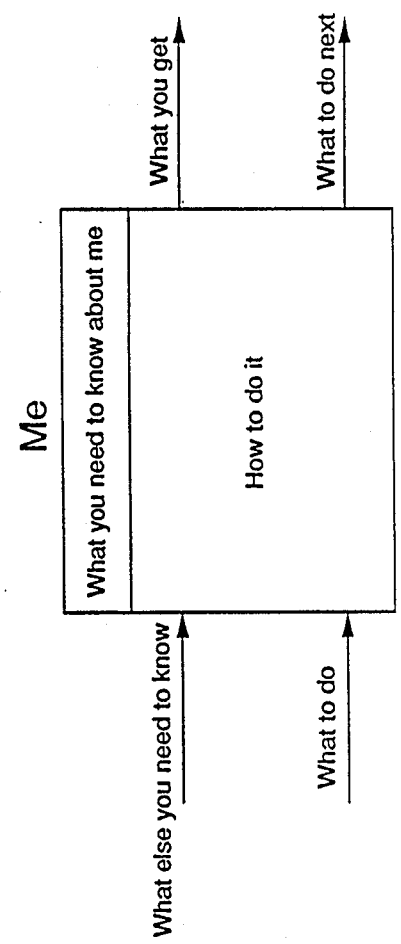
FIG. 39 illustrates the use of a SOFTRON to teach children to program computers.

Finally, it is our belief that the concepts behind the Softron are fundamentally easier to understand than conventional programming languages, when the potential interference from past experience is taken into account. We can easily imagine that the Softron, suitably clothed, will be the most direct and intuitive way to teach children how to program computers. A Softron that has been cast in terms easily understood by children may be seen in FIG. 39.

AN EXAMPLE

A Rule Based System Shell

Most of the examples in this document have been mathematical in nature. In order to show the operation of the Visual Programming Environment in an entirely different application, this section will show some important steps involved in building a rule based expert system shell, that is, a program that takes a set of rules (generally given by an expert) and a set of inputs (generally given by the situation) and draws a logical conclusion. Before building the system, however, a brief discussion of the nature of rule based systems is in order.

Rule based systems may be thought of as having three major components: a rule base (RB) which includes an inference engine for drawing conclusions, short term (working) memory (STM), and long term (fact) memory (LTM). The RB is the repository of knowledge, STM is a scratchpad for recording intermediate conclusions, and LTM is a database of facts.

Rules have two components, an antecedent and a consequent, and are interpreted as conditionals: if the antecedent is true, then the consequent action may be performed. Antecedents are typically database-type queries posed to STM and/or LTM, and consequents are usually actions that result in adding, deleting, or modifying the conclusions currently in STM.

Rule based systems are typically used to apply human-like expertise to some situation in order to diagnose, classify, plan, or the like. The situation in question is usually described via an interaction between the user and the workstation. Assume that this interaction has taken place and that execution of the rule based system will begin with a description of the situation in STM.

Then a typical rule based system will work as follows: the antecedents of all the rules in the rule base are evaluated, and those rules whose antecedents are true are collected. From the collected set, one rule is selected on the basis of priority, recency, or other means by a mechanism called conflict resolution. The consequent of the selected rule is performed (the rule is "fired"), and this usually results in some change to STM and/or LTM. The cycle thus can be meaningfully repeated, since different rules may now have their antecedents true. Execution stops when no rules have antecedents that are true or when an explicit instruction to stop has been given. The contents of STM at this point represent the conclusions that the rule based system has drawn about the situation.

This discussion will focus on the components of RB. STM and LTM are both reasonably simple database structures, and we will simply assume they exist.

Figure 40:
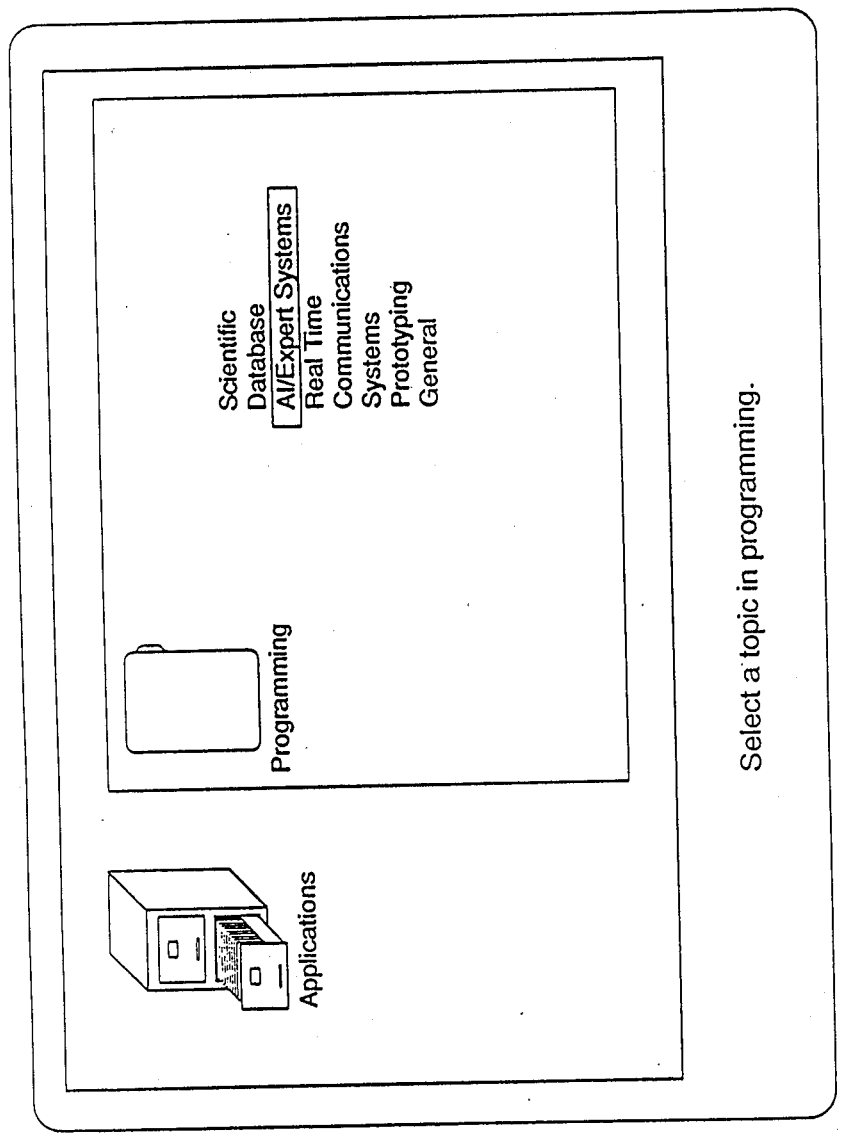
FIG. 40 illustrates the screen appearance for an AI/expert system.

When the user first views the Visual Programming Environment Screen, he or she will see a screen like that shown in FIG. 3. As before, the user chooses the Applications file cabinet, but this time chooses the Programming Tools file folder, and the AI/Expert System Tools line from the window that results. The resulting screen appearance is shown in FIG. 40.

Figure 41:
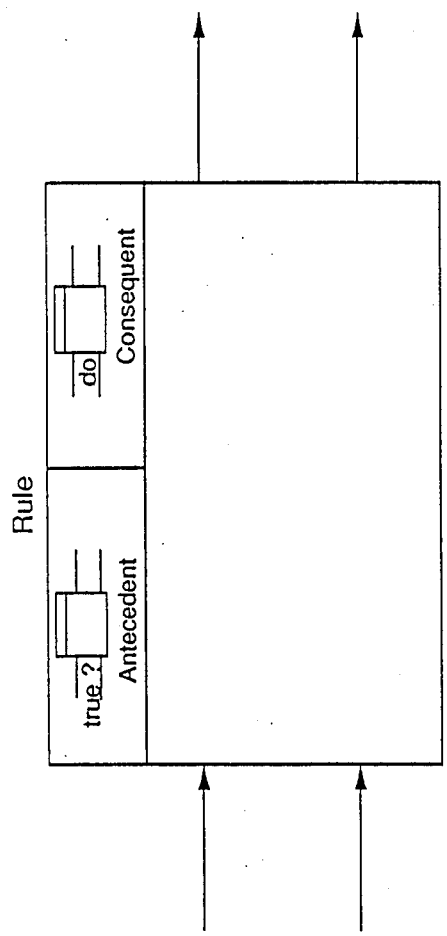
FIG. 41 illustrates the definition of state variables for a Rule SOFTRON.

Next, the user chooses to create a new Softron, Rule. Rule is not usefully like any existing Softron in the library, so the user indicates that Rule will inherit only general Softron characteristics. The first step in defining Rule is to create its state variables. FIG. 41 shows the appearance of the screen after this has been done. Of course, in some systems it will be desirable to specialize Rule to QueryRule when the antecedents are constrained to be queries against STM and LTM.

Figure 42:
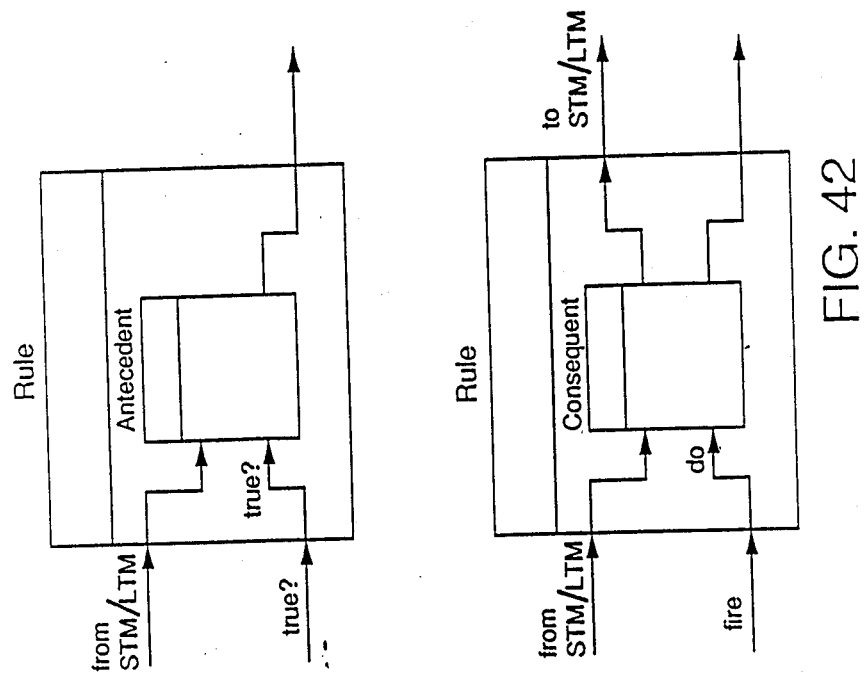
FIG. 42 illustrates the screen appearance after defining the two machines.

The next step is to define the machines for Rule. FIG. 42 shows the screen appearance after defining two important machines: "true?", which evaluates the consequent of the Rule, and "fire", which performs its consequent. It will also be necessary to define Machines that create new Rules and that modify and delete existing ones.

Figure 43:
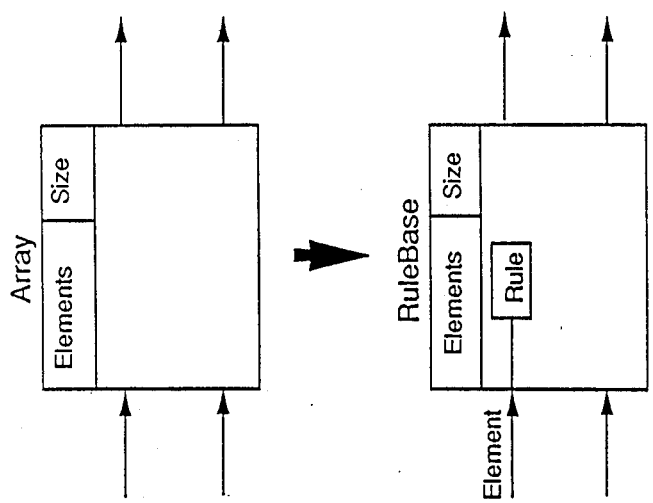
FIG. 43 illustrates a specialization.

The user now defines a RuleBase Softron. RuleBase will be much like Array, which is already in the library, except that the Array elements are constrained to be Rules. The user therefore requests a copy of the Array Softron and indicates this specialization, as shown in FIG. 43. The specialization indicates that whenever an element is a parameter (as will always be the case when Rules are added, modified, or deleted) it is a Rule. All machines involving this parameter are automatically specialized. The net effect is that the Visual Programming Environment now "understands" that the Array elements are Rules.

Figure 44:
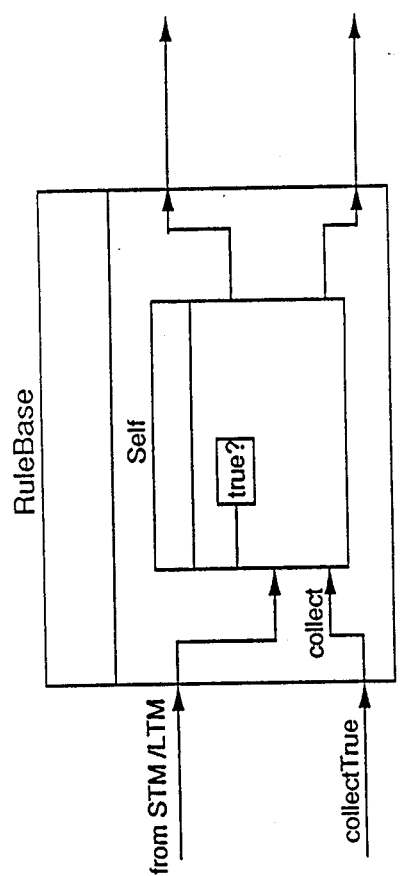
FIG. 44 defines a particular machine.

Now that the State variables have been defined for RuleBase, the user can define its Machines. FIG. 44 shows a "collect-True" machine, which produces the set of Rules in the RuleBase whose antecedents are true. It takes advantage of an existing machine from Array, called "collect", which produces all elements of the array that satisfy a Boolean query posed to the elements of Array, supplied to Array as a parameter. Here, the query parameter has been specialized to Rule's "true?" machine from FIG. 42.

Figure 45:
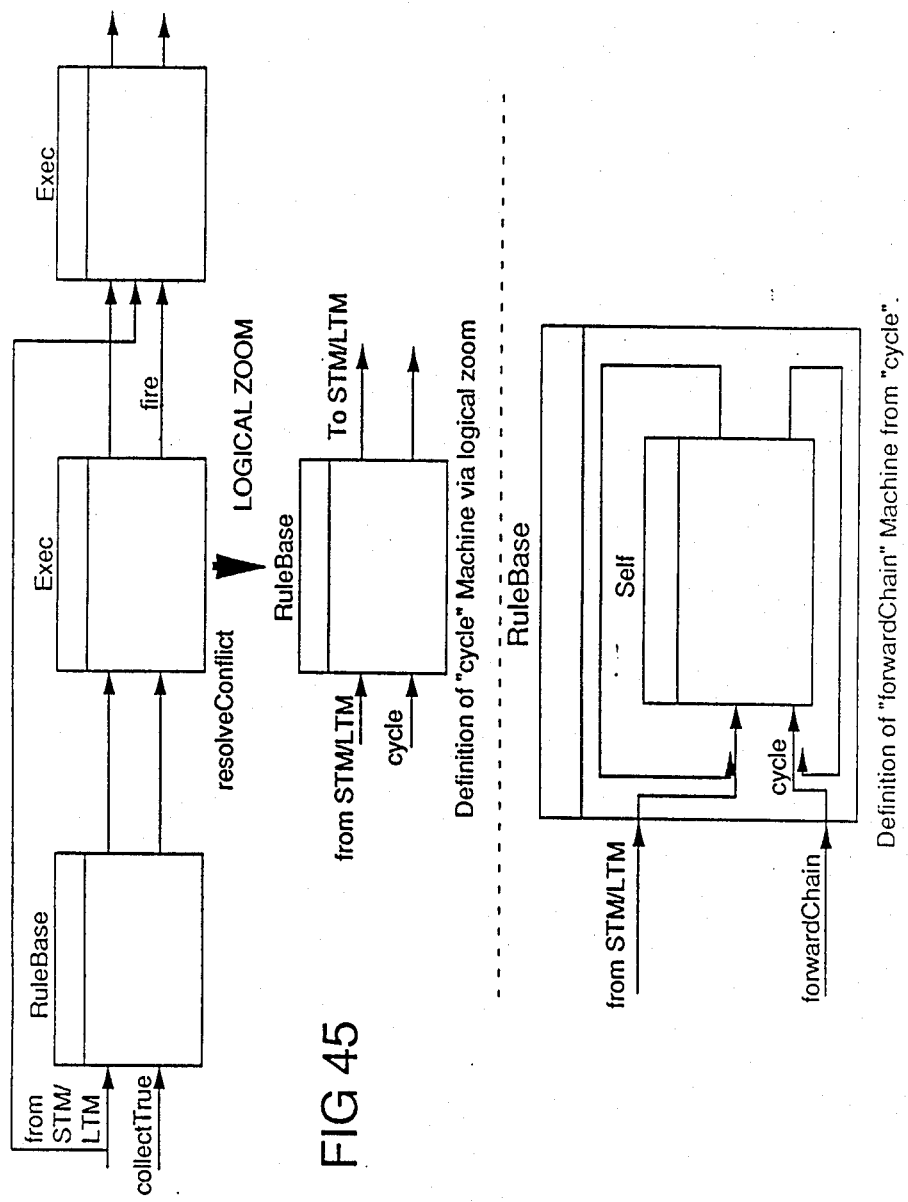
FIG. 45 illustrates two additional machines.

FIG. 45 shows two more RuleBase Machines, "cycle" and "forwardChain". "Cycle" produces one pass through the RuleBase (and uses a Machine not defined here, namely "resolveConflict"), and "forwardChain" builds upon "cycle" to create the top level of RuleBase's inference engine. Since the database primitives in the library will be almost fully adequate to define the STM and LTM Softrons, the user has just completed defining the heart of an entire rule based system shell. If the system will be of production quality, the user will need to program the non-Normal layers to produce appropriate initialization, exception handling, and screen and disk I/O. However, it should be clear from this example that very little effort and time is necessary in the Visual Programming Environment to produce systems of great sophistication.

We claim:

1. A computer based workstation for development of graphical representations of computer programs, said graphical representations being automatically translated into object code and executed, wherein, as said object code executes, said graphical representations change visibly to show flow of data and control within said object code, said workstation comprising:

means of general purpose computing including at least one central processing unit and at least one memory;

means for inputting information to be used by said general computing means;

means for graphical display of information generated and used by said general purpose computing means;

means for automatic storage of information generated or used by said general purpose computing means;

means for controlling operation of said general computing means; and said general purpose computing means programmed to generate graphical atoms on the display means which are connectable by input means to generate said graphical representations of computer programs and to define and show data and control flow within said computer programs.

2. The workstation of claim 1 wherein said graphical representations include graphical atoms of programming information.

3. The workstation of claim 2 wherein each said graphical atom has a plurality of operating modes including normal, initialization/reset, error, and input/output modes, and each of these modes is visible and realized in both the development of said graphical atom and execution of said object code.

4. The workstation of claim 2 wherein said atoms uniformly contain information about state and machine, wherein machine information includes parameter input, parameter output, control input, and control output.

5. The workstation of claim 2 wherein said graphical atoms are created in a plurality of ways including, initial definition, by modifying said state and/or machine information in one of existing said graphical atoms, by combining a plurality of existing said graphical atoms, and by de-combining a graphical atom composed of a plurality of graphical atoms.

6. The workstation of claim 2 wherein said state and machine information of a graphical atom created from said combination of a plurality of graphical atoms is automatically checked and modified so that it is consistent with the state and machine information of said graphical atom's constituent graphical atoms.

7. The workstation of claim 2 wherein visible connections between said graphical atoms represent both flows of control and data between said graphical atoms and dynamically show said flows during execution of said object code.

8. The workstation of claim 2 wherein individual said graphical atoms or groups of said graphical atoms are automatically visibly modified by programs in said general computing means to optimize performance of said graphical atoms or said groups of graphical atoms when they are executed.

* * * * *